US010149255B2

(12) United States Patent
Patel et al.

(10) Patent No.: US 10,149,255 B2
(45) Date of Patent: Dec. 4, 2018

(54) LOW LATENCY UPLINK POWER CONTROL

(71) Applicant: QUALCOMM Incorporated, San Diego, CA (US)

(72) Inventors: Shimman Arvind Patel, San Diego, CA (US); Wanshi Chen, San Diego, CA (US); Peter Gaal, San Diego, CA (US); Hao Xu, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 15/085,844

(22) Filed: Mar. 30, 2016

(65) Prior Publication Data

US 2016/0323887 A1    Nov. 3, 2016

Related U.S. Application Data

(60) Provisional application No. 62/155,976, filed on May 1, 2015.

(51) Int. Cl.
*H04W 72/04* (2009.01)
*H04W 52/34* (2009.01)
(Continued)

(52) U.S. Cl.
CPC .......... *H04W 52/34* (2013.01); *H04W 28/06* (2013.01); *H04W 52/146* (2013.01);
(Continued)

(58) Field of Classification Search
CPC ..... H04L 5/001; H04L 5/0023; H04L 5/1469; H04W 72/0473; H04W 52/365; H04W 72/0446; H04W 52/34
See application file for complete search history.

(56) References Cited

U.S. PATENT DOCUMENTS 9,078,264 B2 * 7/2015 Han ..................... H04W 52/365
2011/0085483 A1 * 4/2011 Yeon ................... H04W 52/365
                                                              370/311
(Continued)

OTHER PUBLICATIONS

CMCC, "Impact Analysis of LAA to RAN2," 3GPP TSG-RAN WG2 Meeting #89, Athens, Greece, R2-150351, Feb. 9-13, 2015, 3 pgs., 3rd Generation Partnership Project.
(Continued)

*Primary Examiner* — Edan Orgad
*Assistant Examiner* — Nourali Mansoury
(74) *Attorney, Agent, or Firm* — Anthony R. Morris

(57) ABSTRACT

Methods, systems, and devices for wireless communication are described. A user equipment (UE) may determine separate uplink (UL) power limitations for multiple transmission time interval (TTI) durations based on distinct power control parameters. In some cases, an adjustment factor or a power backoff may be applied to communications using one TTI duration to ensure that total transmit power does not exceed a threshold. The UE and the serving base station may also identify one or more demodulation reference signal (DMRS) windows. UL data transmissions may be demodulated based on a DMRS sent during the same window. Transmit power control (TPC) commands may be applied at the beginning of each window. However, if an UL transmission is scheduled at the beginning of the window, the UE may wait until a DMRS transmission or until no more transmissions are scheduled for the window before applying the TPC adjustment.

20 Claims, 20 Drawing Sheets

(51) Int. Cl.

| | |
|---|---|
| *H04W 52/36* | (2009.01) |
| *H04W 52/14* | (2009.01) |
| *H04W 52/16* | (2009.01) |
| *H04W 28/06* | (2009.01) |
| *H04L 5/00* | (2006.01) |
| *H04W 52/24* | (2009.01) |
| *H04L 5/14* | (2006.01) |

(52) U.S. Cl.
CPC ......... *H04W 52/16* (2013.01); *H04W 52/365* (2013.01); *H04W 52/367* (2013.01); *H04W 72/0446* (2013.01); *H04L 5/001* (2013.01); *H04L 5/0023* (2013.01); *H04L 5/1469* (2013.01); *H04W 52/243* (2013.01)

(56) References Cited

U.S. PATENT DOCUMENTS

| | | | | |
|---|---|---|---|---|
| 2014/0293843 | A1* | 10/2014 | Papasakellariou | H04W 72/042 370/280 |
| 2014/0321286 | A1 | 10/2014 | Yavuz et al. | |
| 2014/0341195 | A1 | 11/2014 | Yan et al. | |
| 2015/0023240 | A1* | 1/2015 | Gholmieh | H04W 52/228 370/311 |
| 2015/0094112 | A1* | 4/2015 | Lampinen | H04W 52/325 455/522 |

OTHER PUBLICATIONS

ISA/EP, Partial International Search Report of the International Searching Authority, Int'l. App. No. PCT/US2016/025384, Jun. 7, 2016, European Patent Office, Rijswijk, NL, 7 pgs.

New Postcom, "Discussion on RRC Impact of TDD eIMTA," 3GPP TSG RAN WG1 Meeting #76bis, Shenzhen, China, Mar. 31-Apr. 4, 2014, R1-141369, 2 pgs., 3rd Generation Partnership Project.

ISA/EP, International Search Report and Written Opinion of the International Searching Authority, Int'l. App. No. PCT/US2016/025384, dated Aug. 16, 2016, European Patent Office, Rijswijk, NL, 19 pgs.

\* cited by examiner

LOW LATENCY UPLINK POWER CONTROL

CROSS REFERENCES

The present application for patent claims priority to U.S. Provisional Patent Application No. 62/155,976, entitled "Low Latency Uplink Power Control," filed May 1, 2015, assigned to the assignee hereof.

BACKGROUND

The following relates generally to wireless communication, and more specifically to low latency uplink (UL) power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless network may utilize different transmission time interval (TTI) structures. For example, a network may utilize a TTI structure based on one or more symbol periods, which may be shorter in duration than a TTI based on a subframe structure, and which may reduce latency of communications (e.g., for hybrid automatic repeat request (HARQ) operations). However, if the power control for low-latency communications is not coordinated with non-low-latency communications—e.g., if power control for TTIs of one duration is not coordinated with power control for TTIs of a different duration—a UE may not be able to transmit data in both TTIs with sufficient power for a reliable communication link. Or, in some cases, if not properly coordinated, the combined transmit power for different TTI durations may exceed a threshold set by a base station to mitigate interference with other devices.

SUMMARY

A user equipment (UE) may determine separate uplink (UL) transmit power limitations for multiple transmission time interval (TTI) durations based on distinct power control parameters. In some cases, an adjustment factor or a power backoff, or both, may be applied to communications for a particular TTI duration. The UE may also determine and report separate power headroom parameters. In some cases, the adjustment factor may depend on the power headroom parameters. The UE and the serving base station may also identify one or more demodulation reference signal (DMRS) windows. UL data transmissions may be demodulated based on a DMRS sent during the same window. Transmit power control (TPC) commands may be applied at the beginning of each window. However, if an UL transmission is scheduled at the beginning of the window, the UE may wait until a DMRS transmission or until no more transmissions are scheduled for the window before applying the TPC adjustment.

A method of wireless communication is described. The method may include determining a first UL power limitation for a first TTI duration based at least in part on a first power control parameter for the first TTI duration, determining a second UL power limitation for a second TTI duration based at least in part on second power control parameter for the second TTI duration, where the second TTI duration may be greater than the first TTI duration, and transmitting during a first TTI having the first TTI duration based at least in part on the first and second UL power limitations.

An apparatus for wireless communication is described. The apparatus may include means for determining a first UL power limitation for a first TTI duration based at least in part on a first power control parameter for the first TTI duration, means for determining a second UL power limitation for a second TTI duration based at least in part on second power control parameter for the second TTI duration, where the second TTI duration may be greater than the first TTI duration, and means for transmitting during a first TTI having the first TTI duration based at least in part on the first and second UL power limitations.

A further apparatus for wireless communication is described. The apparatus may include a processor, memory in electronic communication with the processor, and instructions stored in the memory and operable, when executed by the processor, to cause the apparatus to determine a first UL power limitation for a first TTI duration based at least in part on a first power control parameter for the first TTI duration, determine a second UL power limitation for a second TTI duration based at least in part on second power control parameter for the second TTI duration, where the second TTI duration may be greater than the first TTI duration, and transmit during a first TTI having the first TTI duration based at least in part on the first and second UL power limitations.

A non-transitory computer-readable medium storing code for wireless communication is described. The code may include instructions executable to determine a first UL power limitation for a first TTI duration based at least in part on a first power control parameter for the first TTI duration, determine a second UL power limitation for a second TTI duration based at least in part on second power control parameter for the second TTI duration, where the second TTI duration may be greater than the first TTI duration, and transmit during a first TTI having the first TTI duration based at least in part on the first and second UL power limitations.

A further method of wireless communication is also described. The method may include identifying a first DMRS window and a second DMRS window, receiving a first TPC command during the first DMRS window, determining whether a second TPC command is received during the second DMRS window, and transmitting an UL data message during the second DMRS window based at least in part on the determination.

A further apparatus for wireless communication is also described. The apparatus may include means for identifying a first DMRS window and a second DMRS window, means for receiving a first TPC command during the first DMRS window, means for determining whether a second TPC command is received during the second DMRS window, and means for transmitting an UL data message during the second DMRS window based at least in part on the determination.

A further apparatus for wireless communication is also described. The apparatus may include a processor, memory in electronic communication with the processor, and instructions stored in the memory and operable, when executed by the processor, to cause the apparatus to identify a first DMRS window and a second DMRS window, receive a first TPC command during the first DMRS window, determine whether a second TPC command is received during the second DMRS window, and transmit an UL data message during the second DMRS window based at least in part on the determination.

A further non-transitory computer-readable medium storing code for wireless communication is also described. The code may include instructions executable to identify a first DMRS window and a second DMRS window, receive a first TPC command during the first DMRS window, determine whether a second TPC command is received during the second DMRS window, and transmit an UL data message during the second DMRS window based at least in part on the determination.

A further method of wireless communication is also described. The method may include transmitting a first power control parameter associated with a first TTI duration, transmitting a second power control parameter associated with a second TTI duration, where the second TTI duration may be greater than the first TTI duration, and receiving a first UL transmission according to the first TTI duration based at least in part on the first power control parameter and a second UL transmission according to the second TTI duration based at least in part on the second power control parameter.

A further apparatus for wireless communication is also described. The apparatus may include means for transmitting a first power control parameter associated with a first TTI duration, means for transmitting a second power control parameter associated with a second TTI duration, where the second TTI duration may be greater than the first TTI duration, and means for receiving a first UL transmission according to the first TTI duration based at least in part on the first power control parameter and a second UL transmission according to the second TTI duration based at least in part on the second power control parameter.

A further apparatus for wireless communication is also described. The apparatus may include a processor, memory in electronic communication with the processor, and instructions stored in the memory and operable, when executed by the processor, to cause the apparatus to transmit a first power control parameter associated with a first TTI duration, transmit a second power control parameter associated with a second TTI duration, where the second TTI duration may be greater than the first TTI duration, and receive a first UL transmission according to the first TTI duration based at least in part on the first power control parameter and a second UL transmission according to the second TTI duration based at least in part on the second power control parameter.

A further non-transitory computer-readable medium storing code for wireless communication is also described. The code may include instructions executable to transmit a first power control parameter associated with a first TTI duration, transmit a second power control parameter associated with a second TTI duration, where the second TTI duration may be greater than the first TTI duration, and receive a first UL transmission according to the first TTI duration based at least in part on the first power control parameter and a second UL transmission according to the second TTI duration based at least in part on the second power control parameter.

A further method of wireless communication is also described. The method may include identifying a first DMRS window and a second DMRS window, transmitting a first TPC command during the first DMRS window, receiving a first DMRS during the first DMRS window based at least in part on the first TPC command, determining whether a second DMRS has been received during the second DMRS window, receiving an UL data message during the second DMRS window, and demodulating the UL data message using the first or second DMRS based at least in part on the determination.

A further apparatus for wireless communication is also described. The apparatus may include means for identifying a first DMRS window and a second DMRS window, means for transmitting a first TPC command during the first DMRS window, means for receiving a first DMRS during the first DMRS window based at least in part on the first TPC command, means for determining whether a second DMRS has been received during the second DMRS window, means for receiving an UL data message during the second DMRS window, and means for demodulating the UL data message using the first or second DMRS based at least in part on the determination.

A further apparatus for wireless communication is also described. The apparatus may include a processor, memory in electronic communication with the processor, and instructions stored in the memory and operable, when executed by the processor, to cause the apparatus to identify a first DMRS window and a second DMRS window, transmit a first TPC command during the first DMRS window, receive a first DMRS during the first DMRS window based at least in part on the first TPC command, determine whether a second DMRS has been received during the second DMRS window, receive an UL data message during the second DMRS window, and demodulate the UL data message using the first or second DMRS based at least in part on the determination.

A further non-transitory computer-readable medium storing code for wireless communication is also described. The code may include instructions executable to identify a first DMRS window and a second DMRS window, transmit a first TPC command during the first DMRS window, receive a first DMRS during the first DMRS window based at least in part on the first TPC command, determine whether a second DMRS has been received during the second DMRS window, receive an UL data message during the second DMRS window, and demodulate the UL data message using the first or second DMRS based at least in part on the determination.

BRIEF DESCRIPTION OF THE DRAWINGS

Aspects of the disclosure are described in reference to the following figures.

DETAILED DESCRIPTION

Figure 1:
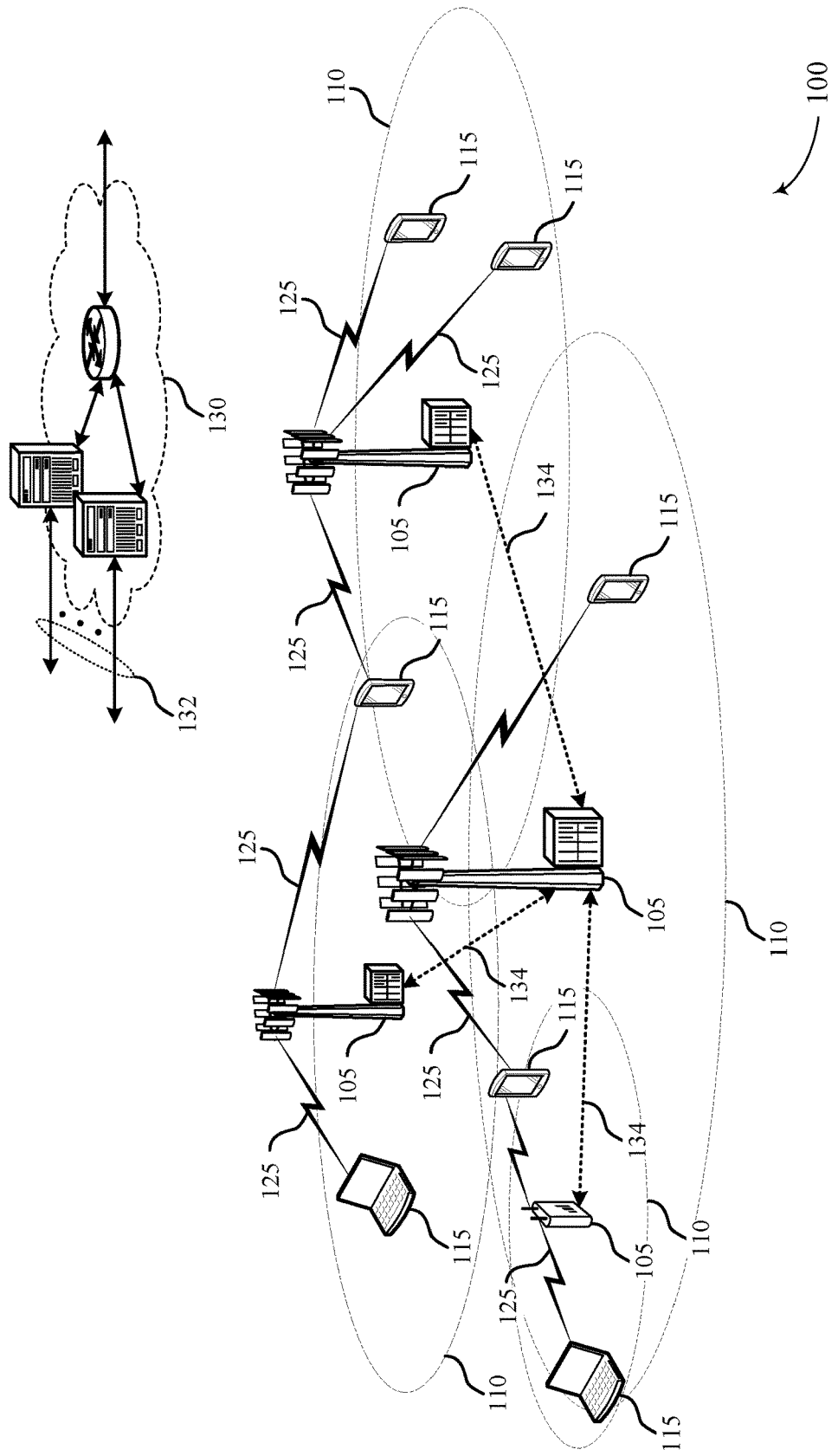
FIG. 1 illustrates an example of a wireless communications system that supports low latency uplink (UL) power control in accordance with various aspects of the present disclosure.

A wireless communication system may utilize low-latency communications, and the system may employ power control measures to account for such communications. For example, a network may operate based on a reduced transmission time interval (TTI), which may have a duration of one or more symbol periods or slots of a Long Term Evolution (LTE) system. In some cases, low-latency communications may be supported simultaneously together with non-low-latency (e.g., standard or legacy) communications (e.g., based on a 1 ms TTI, or an LTE subframe). Low-latency power control may include procedures for determining uplink (UL) transmit power and reporting power headroom, as well as additional aspects, such as weighting low-latency and non-low-latency transmissions, setting UL traffic-to-pilot ratios, and establishing power control subframe and symbol sets.

During low-latency communications, a maximum configured transmit power ($P_{CMAX}$) may vary from symbol to symbol (or from TTI to TTI). For example, when both non-low-latency and low-latency are transmitted together, $P_{CMAX}$ may be lowered to account for non-low-latency power. In some cases, power control parameters may be set differently for low-latency and non-low-latency (e.g., legacy) users. However, the same power headroom formula can be used for low-latency and non-low-latency communications (although separate power headroom parameters may be maintained).

For simultaneous low-latency and non-low-latency UL transmissions, it may be appropriate for a base station to know (e.g., accurately estimate) both low-latency and non-low-latency power allocations in order to set a traffic-to-pilot ratio correctly based on the demodulation scheme. In some cases, a semi-static split may be selected in which non-low-latency traffic may have one of two power backoffs. Another alternative may be to have a dynamic semi-static split. Another alternative may be to determine if the total power allocation is greater than $P_{CMAX}$. If so, an adjustment factor can be computed and applied to the non-low-latency channel.

Low-latency signals may be demodulated using a demodulation reference signal (DMRS) signal, which may be scheduled by a base station. In some cases, a traffic-to-pilot ratio may vary for a low-latency transmissions. That is, traffic and pilot power can vary by symbol via an UL grant. The power allocation may, for instance, be based on DMRS bandwidth, preconfigured DMRS offset power, and may also use data channel power control parameters.

A UE and a base station may operate using predetermined windows such that DMRS in earlier symbols within the same window can be used for low-latency demodulation. If there is no power control adjustment across two adjacent windows, DMRS of a previous window may be used for demodulation of a current window. When there is a low-latency data symbol at the start of the window, if a power control command was also issued at the start of the window, a UE may delay execution or utilization of the last-received power control command.

In some examples, power control states may be kept individually for specific subframes or symbols. That is, specific time periods experiencing significantly different interference characteristics can be classified into different, separate subframe sets. Thus, low-latency communications may maintain separate power control state variables as a function of subframe to account for the difference in power.

Aspects of the disclosure are initially described below in the context of a wireless communication system. Specific examples are then described for applying different power control limitations for low-latency and non-low latency (e.g., legacy) communications and for applying power low-latency power control updates based on DMRS windows. These and other aspects of the disclosure are further illustrated by and described with reference to apparatus diagrams, system diagrams, and flowcharts that relate to low latency UL power control.

FIG. 1 illustrates an example of a wireless communications system 100 in accordance with various aspects of the present disclosure. The wireless communications system 100 includes base stations 105, user equipment (UE) 115, and a core network 130. In some examples, the wireless communications system 100 may be a Long Term Evolution (LTE)/LTE-Advanced (LTE-A) network. For example, wireless communications system 100 may be an LTE system utilizing low-latency communications and non-low-latency communications simultaneously.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Time intervals in LTE may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). For example, in some cases a system may utilize TTIs based on a subframe simultaneously with TTIs based on a symbol period or slot, for example.

As mentioned above, the term "non-low-latency" used herein may refer to communications employing LTE numerology, which may include TTIs having a duration of 1 ms (e.g., based on a subframe). Such non-low-latency communications may also be referred to as "legacy communications," or legacy operation, because they may employ aspects of earlier (i.e., legacy) releases of the LTE standard as compared to low-latency communications. Low-latency communications may refer to those communications using TTIs based on a symbol period or slot.

A UE 115 may receive DL signals including a physical downlink control channel (PDCCH) and a physical downlink shared channel (PDSCH) for data. On the UL, the UE 115 may transmit a physical uplink control channel (PUCCH) and a physical uplink shared channel (PUSCH). PUCCH may be used for UL acknowledgements (ACKs), scheduling requests (SRs) and channel quality indicators (CQI) and other UL control information. PUSCH may be used for transmission of user data. In some cases, separate channels may be used for low-latency communication (e.g., uPDCCH, uPDSCH, uPUCCH and uPUSCH). Low-latency UL transmissions may be demodulated by a base station 105 with the aid of UL demodulation reference signals (DMRS).

A UE 115 may coordinate transmit power (e.g., for PUCCH, PUSCH, uPUCCH, and uPUSCH) with a serving base station to mitigate interference, improve the UL data rate, and prolong battery life. UL power control may include a combination of open-loop and closed-loop mechanisms. In open-loop power control the UE 115 transmit power depends on estimates of the DL path-loss and channel configuration. In closed-loop power control, the network can directly control the UE 115 transmit power using explicit power-control commands. Open-loop power control may be used for initial access, whereas both open and closed loop control may be used for UL control and data transmission. A UE 115 may determine power using an algorithm that takes into account a maximum transmission power limit, a target base station receiver power, path loss, modulation and coding scheme (MCS), the number of resources used for transmission, and the format of the transmitted data (e.g., PUCCH format). Power adjustments may be made by a base station 105 using a transmit power command (TPC) messages, which may incrementally adjust the transmit power of a UE 115 as appropriate. In some cases, low-latency power control may be based on separate parameters from non-low-latency communications.

In some cases, wireless communications system 100 may utilize one or more enhanced component carriers (eCCs). An eCC may be characterized by one or more features including: flexible bandwidth, different TTIs, and modified control channel configuration, any which may support low-latency communications. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced PDCCH (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

Thus, a UE 115 may determine separate UL power limitations for multiple TTI durations based on distinct power control parameters. In some cases, an adjustment factor or a power backoff may be applied to communications using one TTI duration to ensure that total transmit power does not exceed a threshold. The UE 115 may also determine and report separate power headroom parameters. In some cases, the adjustment factor may depend on the power headroom parameters. The UE 115 and the serving base station 105 may also identify one or more DMRS windows. UL data transmissions may be demodulated based on a DMRS sent during the same window. TPC commands may be applied at the beginning of each window, or TPC commands may be applied later if, for instance, an UL transmission is scheduled at the beginning of the window.

Figure 2:
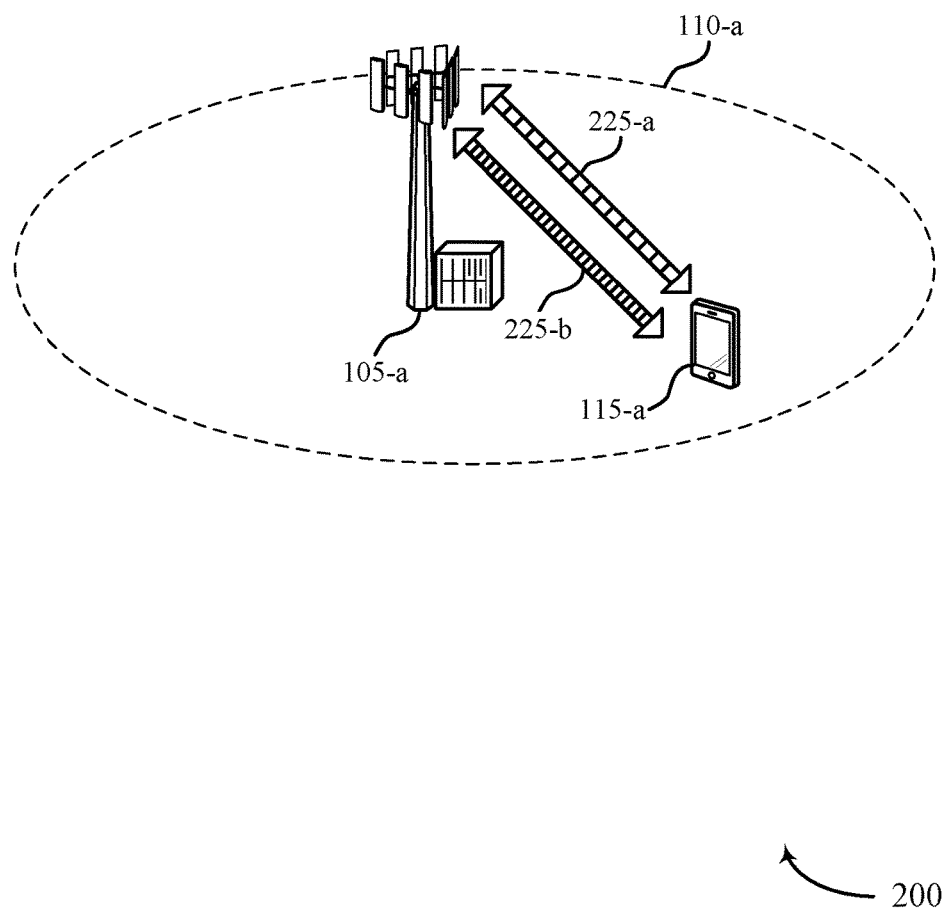
FIG. 2 illustrates an example of a wireless communications system that supports low latency UL power control in accordance with various aspects of the present disclosure.

FIG. 2 illustrates an example of a wireless communications system 200 for low latency UL power control in accordance with various aspects of the present disclosure. Wireless communications system 200 may include a UE 115-a and base station 105-a, which may be examples of a UE 115 base station 105 described with reference to FIG. 1. UE 115-a and base station 105-a may communicate using a non-low-latency communications link 225-a and low-latency communications link 225-b.

Low-latency communications link 225-b may operate based on a TTI based on a symbol period, a slot, or the like, which may represent a shorter duration TTI than a legacy communication may use. In some cases, low-latency communications link 225-b may be supported simultaneously, or nearly simultaneously, with non-low-latency communications link 225-a (e.g., based on a 1 ms TTI). A system utilizing low-latency communications may include low-latency specific procedures for setting UL power levels. Some aspects of the low-latency power control may be complementary to non-low-latency power control. For example, low-latency power control may include procedures for determining UL transmit power, including both open loop and closed loop components, and reporting power headroom. Additionally, low-latency power control may also include additional aspects such as weighting low-latency and non-low-latency transmissions, setting UL traffic-to-pilot ratios, and establishing power control subframe and symbol sets.

UL power control for low-latency communications link 225-b may be based on a formula such as:

$$P_{uPUSCH,c}(i) = \min\left\{\begin{array}{l}10\log_{10}(\hat{P}_{CMAX}(i) - \hat{P}_{uPUCCH}(i)),\\ 10\log_{10}(M_{uPUSCH}(i)) + P_{O\_uPUSCH}(j) + \alpha_{ULL} \cdot PL + \Delta_{TF,ULL}(i) + f_{ULL}(i)\end{array}\right\},$$

where $P_{CMAX}$ may represent a maximum configured transmit power; PL may be a path-loss estimate, which may be the consistent for low-latency and non-low-latency communications link 225-a; $P_{uPUCCH}$ may be a the low-latency physical uplink control channel (uPUCCH) transmit power (i.e., if uPUCCH is active, the low-latency physical uplink shared channel (uPUSCH) power is limited by uPUCCH power); $M_{uPUSCH}$ may be the uPUSCH bandwidth (measured in resource blocks); $P_{o\_uPUSCH}$ may be the nominal power offset for uPUSCH transmission; $\Delta_{TF,low-latency}$ may be a parameter calculated based on the formula $10\log_{10}((2^{BPRE \cdot K_s}-1) \cdot \beta_{offset}^{uPUSCH}$ with $\beta_{offset}^{uPUSCH} > 1$ if uPUSCH contains control information; $f_{ULL}$ may be a closed loop power control command, which may be applied a predetermined number of symbols after a TPC command is received; and $\alpha_{ULL}$ may be a fractional power control established for low-latency operation.

In some cases, $P_{CMAX}$ may vary from symbol to symbol, or from TTI to TTI. For example, when both non-low-latency and low-latency are transmitted together, $P_{CMAX}$ may be lowered to account for non-low-latency power. In some cases, $P_{o\_uPUSCH}$ and the fractional power constant $\alpha_{ULL}$ may be set differently for low-latency and non-low-latency communications link 225-a. In some cases, single-cell power control may be based on $P_{o\_uPUSCH}$ being set to a noise-density level and $\alpha_{ULL}$ being set to one for all users. For non-low-latency communications link 225-a, lowering $\alpha_{ULL}$ coupled with an increase in the nominal offset $P_{o\_u}$-$_{PUSCH}$ may allow for higher overall network throughput. In some cases, power levels at the cell edge may be set to reduce in inter-cell interference (at the expense of lowering throughput of cell-edge users). In some cases, the low-latency link budget may be a limiting factor based on the combined low-latency and non-low-latency network. Still, the value of $P_{o\_uPUSCH}$ may be lowered and $\alpha_{ULL}$ may be increased relative to the settings for combined operations of low-latency communications link 225-b and non-low-latency communications link 225-a. This may result in more equal scheduling of resources across all users while still optimizing overall network throughput.

In some cases, a common power headroom formula may be employed for low-latency communications link 225-b and non-low-latency communications link 225-a. However, separate power headroom parameters may be maintained. In some cases, the power headroom report for each type of communications may not be a function of variables other than a report type. For example, type 1 reports (which may not include uPUCCH power) and type 2 reports (accounting for uPUCCH) may be supported. In some cases, the same trigger mechanism for sending low-latency and non-low-latency reports (e.g., a significant change in path loss compared to a threshold, or a specific amount of elapsed since a previous report). This may allow a base station to retain an up-to-date path-loss estimate as well as the sum of the accumulated power control commands for both non-low-latency and low-latency configurations. In some cases, $P_{CMAX}$ may be transmitted with the low-latency power headroom report. Furthermore, the low-latency and non-low-latency power headroom reports may be synchronized such they are sent together.

For simultaneous, or nearly simultaneous, low-latency and non-low-latency UL transmissions, it may be appropriate for a base station to know or accurately estimate both low-latency and non-low-latency power allocations, which may aid in correctly setting a traffic-to-pilot ratio based on the demodulation scheme. Several alternatives for coordinating power allocations may be considered. For example, a semi-static split may be selected in which non-low-latency (e.g., 1 ms) traffic may have one of two power backoffs, e.g., {−3, 0}. As long as there is low-latency traffic in a symbol (e.g., even if the UE is not power limited), a −3 dB backoff may be selected; otherwise the 0 dB backoff may be selected. However, in some cases this may result in an undesirable reduction of power for PUSCH, even if the UE is not power limited, and may also result in limited coverage for low-latency communications (e.g., limited to the 3 dB offset). Another alternative may be to have a dynamic semi-static split. For example, such a scheme may involve three power backoffs: {−∞, −3, 0}. If there is low-latency traffic and the UE is power limited, −∞ may be used; if there is low-latency but the UE is not power limited, −3 dB may be used; otherwise, 0 dB may be used. This may eliminate the coverage limitation for low-latency, but may still in a reduction of power for PUSCH.

Another alternative for coordinating low-latency and non-low-latency power allocations may be to use the power headroom report to aid the choice of power levels. That is, if the sum of PUSCH (on non-low-latency communications link 225-*a*) and uPUSCH (on low-latency communications link 225-*b*) power allocation is less than $P_{CMAX}$, a UE may transmit both channels at the computed $P_{PUSCH}$ and $P_{uPUSCH}$ power levels. If the sum of PUSCH and uPUSCH power allocation is greater than $P_{CMAX}$, an adjustment factor ($W_1$) can be computed and applied to the PUSCH channel to decrease the likelihood that the maximum power limit is exceeded (that is, to attempt to ensure that $W_1 \cdot P_{PUSCH} + P_{uPUCCH} = P_{CMAX}$). In some cases, $W_1$ may be known by both base station and UE, which may allow for the correct traffic-to-pilot ratio to be used in PUSCH demodulation for the colliding low-latency symbol. $W_1$ may be derived from the last low-latency and non-low-latency power headroom reports. That is, the power levels $P_{PUSCH}$ and $P_{uPUSCH}$ can be computed based on knowledge of power headroom reports (and, for example, a desired modulation and coding scheme MCS for both kinds of traffic). $W_1$ may then be computed as $(P_{CMAX} - P_{uPUSCH})/P_{PUSCH}$. In some cases, this may ensure successful transmission of uPUSCH at the expense of lower power being used for one or more PUSCH symbols. In some cases, a margin may be imposed on the equation based on a closed loop power control update not being reflected in the power headroom reports.

In some cases, a uPUSCH signal may be demodulated via a DMRS signal (which may be scheduled by the base station). In some cases, a fixed traffic-to-pilot ratio does not hold for a low-latency transmissions. That is, traffic and pilot power can vary on any symbol via an UL grant. The power allocation may be based on DMRS bandwidth, preconfigured DMRS offset power, and may also use parameters from uPUSCH. For example, the DMRS pilot power may be set according to a formula such as:

$$P_{DMRS}(i) = \min\{P_{CMAX}(i), P_{DMRS\_OFFSET}(m) + 10 \log_{10}(M_{DRMS}) + P_{O\_uPUSCH}(j) + \alpha_c(j) \cdot PL_c + f(i)\}$$

where $P_{O\_uPUSCH}$ may be the nominal PUSCH power density and $f(i)$ may be the current uPUSCH power control adjustment state.

Knowledge of the traffic-to-pilot ratio between DMRS symbols and uPUSCH symbols at the base station may support proper demodulation and may result in limitations on when an UL power control command can be applied. Thus, UE 115-*a* and base station 105-*a* may operate according to predetermined windows, such that DMRS in an earlier symbol or symbols within the same window can be used for low-latency demodulation. In some cases, power control commands may be issued or applied at the start of a window in order to avoid phase shifts, based, for instance, on unanticipated power changes. In some cases, the window may be aligned with 1 ms subframes to support coordination with non-low-latency power control. Across different windows, there may be a changes in power (and hence, a phase shift), which may affect coherent demodulation between DMRS and low-latency UL data. But, in some cases, if there is no power control adjustment across two adjacent windows, DMRS of a previous window may be used for demodulation of current window and UE 115-*a* may not make changes in closed loop power between previous the DMRS and current low-latency data symbol.

When there is a low-latency data symbol at the start of the window, if a power control command was also issued at the start of the window, UE 115-*a* may delay execution of the power change. For example, the power change may be delayed until either there are no more low-latency UL data symbols being scheduled or a DMRS symbol is scheduled on the UL. For the case of standalone low-latency operation another alternative is that the base station may only schedule power control commands such that they coincide with a DMRS pilot scheduled on the UL. This may implicitly define a window with beginning and end boundaries corresponding to DMRS symbols.

In some cases, power control states for low-latency communications link 225-*b* may be kept individually for specific subframes. That is, specific subframes experiencing different interference characteristics can be classified into different, separate subframe sets. For example, in the case of TDD with dynamic UL/DL configuration on a per-cell basis, variation in interference level across subframes can be large. Thus, low-latency communications may maintain separate power control state variables as a function of subframe to account for the difference in power. A similar strategy may also be adopted at the symbol level for low-latency traffic or for any case where specific symbols have a statistically different loading/interference level than the remaining symbols. That is, power control state information can be held separately for members of the symbol set. Thus, the symbols can be classified into symbol sets based, for example, on interference statistics. For instance, non-low-latency inter-cell sounding reference signal transmissions on the last symbol of subframe may have interference level that differs from prior symbols in subframe.

Figure 3:
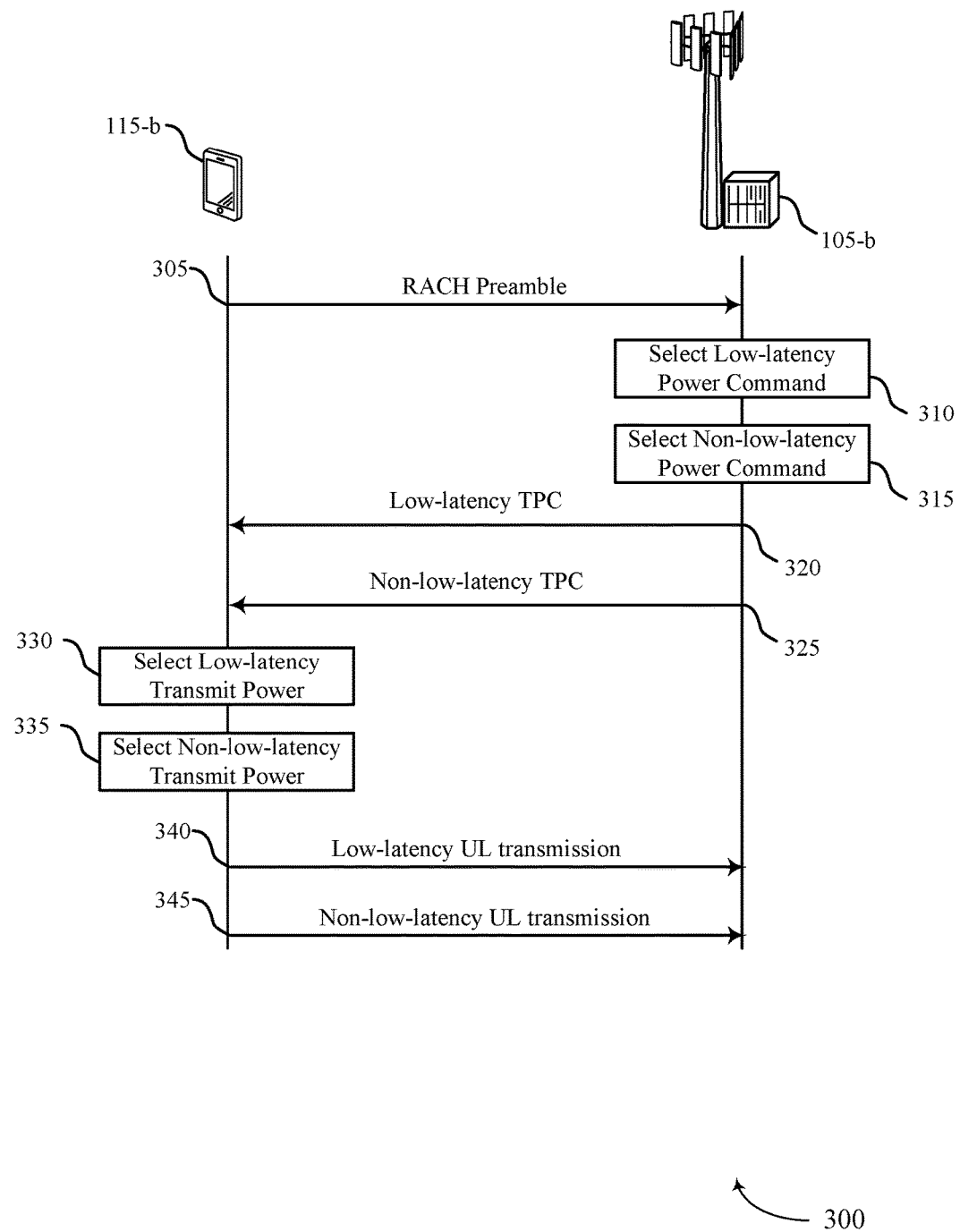
FIG. 3 illustrates an example of a process flow in a system that supports low latency UL power control in accordance with various aspects of the present disclosure.

FIG. 3 illustrates an example of a process flow 300 in a system that supports low latency UL power control in accordance with various aspects of the present disclosure. Process flow 300 may include a UE 115-*b* and base station 105-*b*, which may be examples of a UE 115 and base station 105 described with reference to FIGS. 1-2.

At 305, UE 115-*b* may transmit a RACH preamble to base station 105-*b* in order to establish a wireless connection. At 310, base station 105-*b* may determine a low-latency TPC update for UE 115-*b* based on receiving the RACH preamble or a subsequent UL transmission. At 315, base station 105-*b* may determine a non-low-latency TPC update for UE 115-*b* based on receiving the RACH preamble or a subsequent UL transmission.

At 320, base station 105-*b* may transmit the low-latency TPC command to UE 115-*a*. Thus, base station 105-*b* may transmit a first power control parameter associated with a first TTI duration. At 325, base station 105-*b* may transmit the non-low-latency TPC command to UE 115-*a*. Thus, base station 105-*b* may transmit a second power control parameter associated with a second TTI duration, such that the second TTI duration may be greater than the first TTI duration.

At 330, UE 115-*b* may select a low-latency transmit power based on the low-latency TPC command. That is, UE 115-*b* may determine a first UL power limitation for a first TTI duration based on a first power control parameter for the first TTI duration.

At 335, UE 115-*b* may select a non-low-latency transmit power based on the non-low-latency TPC command. That is, UE 115-*b* may determine a second UL power limitation for a second TTI duration based on second power control parameter for the second TTI duration, such that the second TTI duration may be greater than the first TTI duration.

In some cases, UE 115-*b* may adjust a cell maximum transmit power parameter of the first UL power limitation and the second UL power limitation based on the second TTI including the first TTI. In some examples, the first transmit power limitation includes a cell maximum transmit power parameter, a path loss parameter, a control transmission power parameter, a bandwidth parameter, a power offset parameter, a closed loop feedback parameter, a fractional power control parameter, or some combination of such parameters. In some examples, the power offset parameter and the fractional power control parameter are based on a low latency link budget.

In some cases, UE 115-*b* may apply an adjustment factor to the second UL power limitation for the second message based on whether the first message may be determined to occur during the second message. In some examples, transmitting during the first TTI includes transmitting the first message based on the first UL power limitation and transmitting the second message based on the second UL power limitation with the applied adjustment factor. In some examples, the adjustment factor is based on a first power headroom associated with the first TTI duration and a second power headroom associated with the second TTI duration. In some examples, the adjustment factor is calculated such that the sum of the first UL power limitation and the second UL power limitation with the adjustment factor is equal to a cell maximum transmit power parameter.

In some cases, UE 115-*b* may select the adjustment factor from a set of power backoffs. In some examples the set of power backoffs includes a power limited low latency backoff, a non-power limited low latency backoff, a low latency backoff, a non-low latency backoff, or any combination thereof.

At 340, UE 115-*b* may send a low-latency UL transmission using the selected low-latency power. In some cases, UE 115-*b* may determine whether a first message for the first TTI may be scheduled to occur during a second message for a second TTI having the second TTI duration, such that the second TTI may include the first TTI. In some cases, UE 115-*b* may determine whether a first message for the first TTI may be scheduled to occur during a second message for a second TTI having the second TTI duration.

At 345, UE 115-*b* may send a non-low-latency UL transmission using the selected non-low-latency power. Thus, UE 115-*b* may transmit during a first TTI having the first TTI duration based on the first and second UL power limitations. In some examples, transmitting during the first TTI includes transmitting a first message during the first TTI having the first TTI duration based on the first UL power limitation and transmitting a second message during a second TTI having the second TTI duration based on the second UL power limitation. In some examples, as discussed above, the second TTI includes the first TTI.

Accordingly, base station 105-*b* may receive a first UL transmission according to the first TTI duration based on the first power control parameter and a second UL transmission according to the second TTI duration based on the second power control parameter.

In some cases, UE 115-*b* may determine a first power headroom associated with the first TTI duration and a second power headroom associated with the second TTI duration. UE 115-*b* may transmit a first power headroom report indicative of the first power headroom together with a second power headroom report indicative of the second power headroom. Accordingly, base station 105-*b* may receive a first power headroom report indicative of a first power headroom associated with the first TTI duration together with a second power headroom report indicative of a second power headroom associated with the second TTI duration.

In some cases, UE 115-*b* may identify a first set of subframes based on a first interference characteristic and a second set of subframes based on a second interference characteristic. UE 115-*b* may maintain a first set of power control variables for the first set of subframes and a second set of power control variables for the second set of subframes, and the first or second UL power limitation may be based on the first or second set of power control variables.

Figure 4:
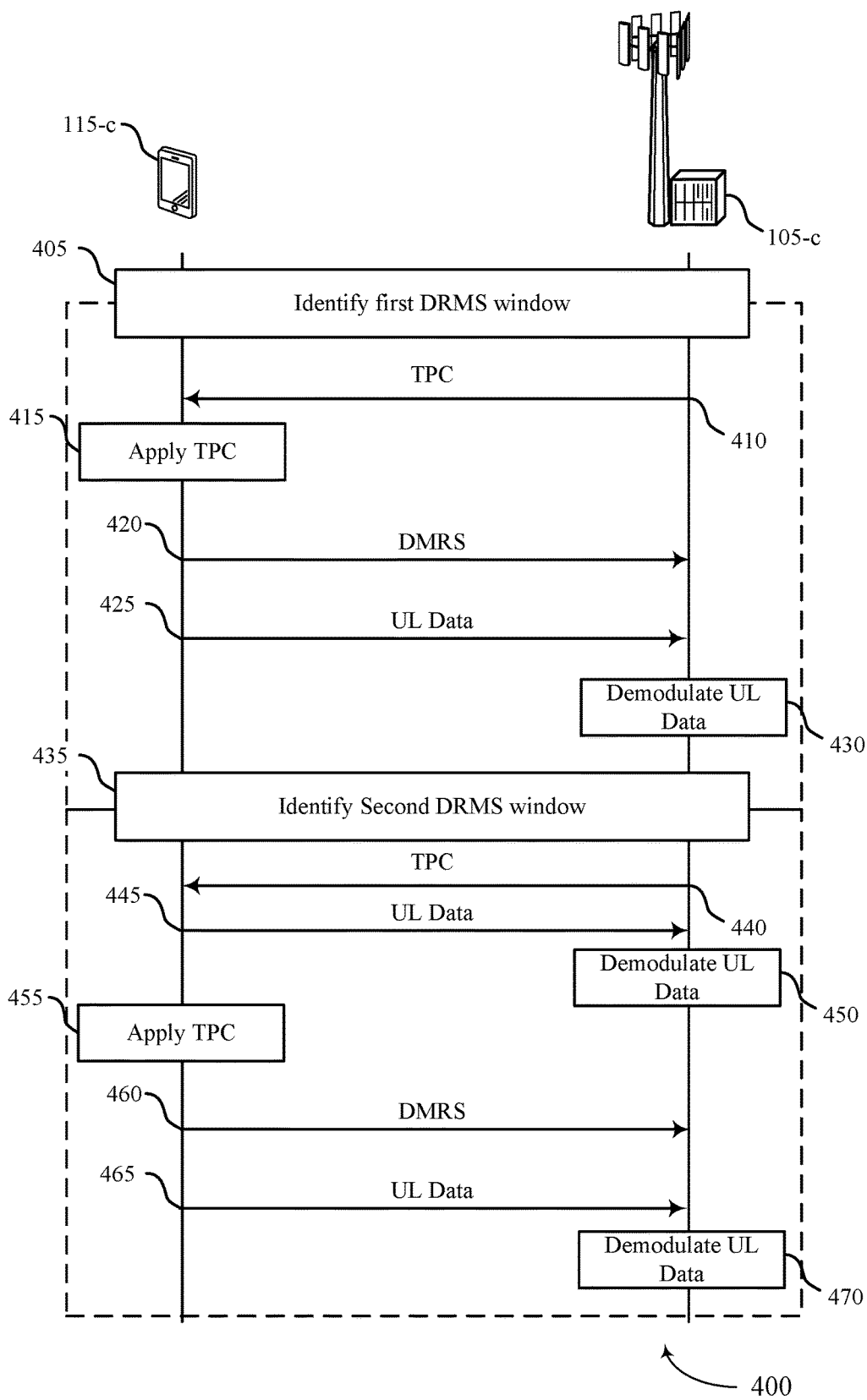
FIG. 4 illustrates an example of a process flow in a system that supports low latency UL power control utilizing demodulation reference signal (DMRS) windows in accordance with various aspects of the present disclosure.

FIG. 4 illustrates an example of a process flow 400 in a system that supports low latency UL power control in accordance with various aspects of the present disclosure. Process flow 400 may include a UE 115-*c* and base station 105-*c*, which may be examples of a UE 115 and base station 105 described with reference to FIGS. 1-3.

At 405, UE 115-*c* and base station 105-*c* may identify a first DMRS window. At 410, base station 105-*c* may transmit a first TPC command during the first DMRS window. For example, base station 105-*c* may transmit a first TPC command to UE 115-*c* during the first symbol of the first DMRS window. Similarly, UE 115-*c* may receive a first TPC command during the first DMRS window.

At 415, UE 115-*c* may update a low-latency transmission power based on the first TPC command. At 420, UE 115-*c* may transmit a first DMRS based on the first TPC command, and base station 105-*c* may receive a first DMRS during the first DMRS window based on the first TPC command.

At 425, UE 115-*c* may transmit first UL data to base station 105-*c*. At 430, base station 105-*c* may demodulate the first UL data based on the first DMRS.

At 435, UE 115-*c* and base station 105-*c* may identify a second DMRS window. Thus, UE 115-*c* and base station 105-*c* may identify a DMRS window and a second DMRS window.

At 440, base station 105-*c* may transmit a second TPC command to UE 115-*c* during the first symbol of the second DMRS window. That is, UE 115-*c* may determine whether a second TPC command is received during the second DMRS window, and in some cases, may receive the second TPC command during the second DMRS window. UE 115-*c* may then transmit an UL data message during the second DMRS window based on the determination.

At 445, UE 115-*c* may transmit second UL data to base station 105-*c* during the first symbol of the second DMRS window based on the first TPC command. That is, UE 115-*c* may determine that the UL data message is scheduled for an initial symbol period of the second DMRS window and may apply the first TPC command (or maintain power control settings) based on the determination.

In some cases, UE 115-*c* may determine that the UL data message is not scheduled for an initial symbol period of the second DMRS window. Then UE 115-*c* may immediately or nearly immediately apply the second TPC command.

At 450, base station 105-*c* may demodulated the second UL data based on the first DMRS—because, e.g., base station 105-*c* has yet to receive a DMRS based on the second TPC command. That is, base station 105-*c* may determine whether a second DMRS has been received during the second DMRS window.

In some examples, determining whether a second DMRS has been received during the second DMRS window may include determining that the second DMRS has not been received during the second DMRS window. In these examples, the UL data message may be demodulated based on the first DMRS.

At 455, UE 115-*c* may apply the second TPC command. At 460, UE 115-*c* may transmit a second DMRS based on the second TPC command. That is, UE 115-*c* may transmit a DMRS during the second DMRS window after transmitting the UL data message. UE 115-*c* may then transmit the UL data message during the second DMRS window based on the applied first or second TPC command.

At 465, UE 115-*c* may transmit third UL data based on the second TPC command. Thus, UE 115-*c* may transmit another UL data message after transmitting the second DMRS, such that the UL data message is transmitted using the second TPC command based on the DMRS. That is, UE 115-c may transmit the UL data message during the second DMRS window based on either the first or second TPC command.

At 470, base station 105-c may demodulate the third UL data based on the second DMRS. Thus, base station 105-c may demodulate the UL data message using the first or second DMRS based on the determination. In some examples, determining whether a second DMRS has been received during the second DMRS window may include determining that the second DMRS has been received during the second DMRS window.

Figure 5:
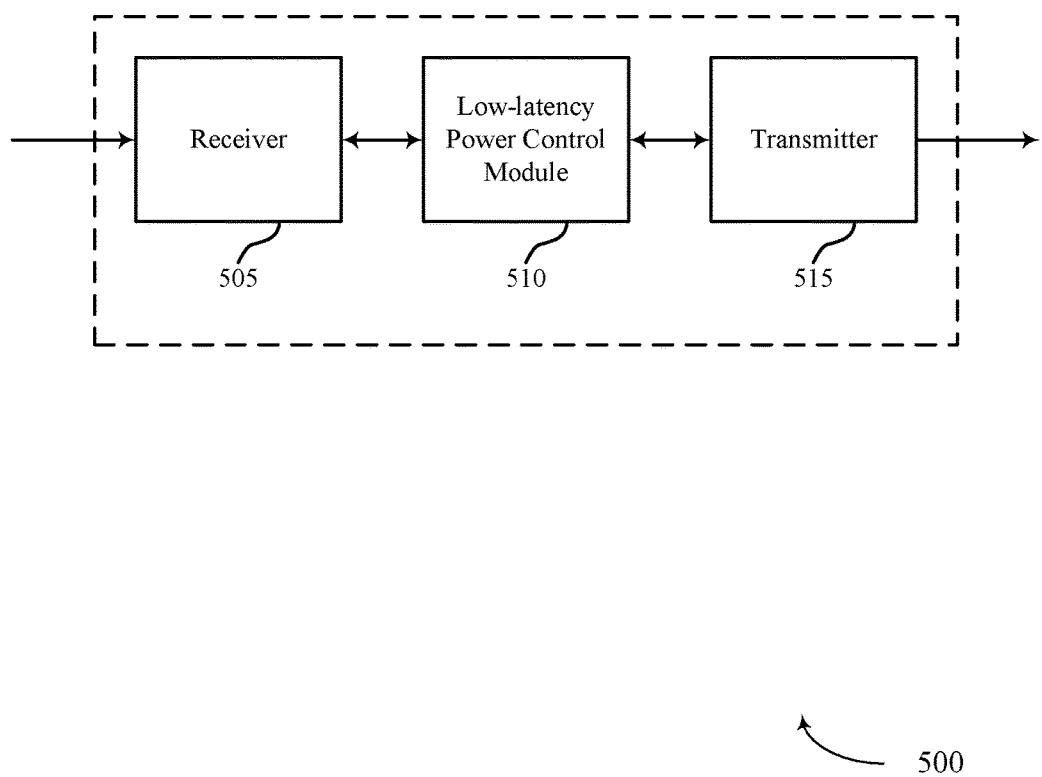
FIGS. 5-7 show block diagrams of a wireless device or devices that support low latency UL power control in accordance with various aspects of the present disclosure.

FIG. 5 shows a block diagram of a wireless device 500 configured that supports low latency UL power control in accordance with various aspects of the present disclosure. Wireless device 500 may be an example of aspects of a UE 115 described with reference to FIGS. 1-4. Wireless device 500 may include a receiver 505, a low-latency power control module 510, or a transmitter 515. Wireless device 500 may also include a processor. Each of these components may be in communication with one another.

The receiver 505 may receive information such as packets, user data, or control information associated with various information channels (e.g., control channels, data channels, and information related to low latency UL power control, etc.). Information may be passed on to the low-latency power control module 510, and to other components of wireless device 500.

The low-latency power control module 510 may determine a first UL power limitation for a first TTI duration based on a first power control parameter for the first TTI duration, determine a second UL power limitation for a second TTI duration based on a second power control parameter for the second TTI duration—e.g., the second TTI duration may be greater than the first TTI duration—and transmit during a first TTI having the first TTI duration based on the first and second UL power limitations.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

In some examples, the transmitter 515 may transmit during a first TTI having the first TTI duration based on the first and second UL power limitations. In some examples, transmitting during the first TTI includes transmitting a first message during the first TTI having the first TTI duration based on the first UL power limitation, and transmitting a second message during a second TTI having the second TTI duration based on the second UL power limitation. In some examples, the second TTI includes the first TTI. In some examples, the transmitter 515 may transmit a first power headroom report indicative of the first power headroom together with a second power headroom report indicative of the second power headroom.

In some examples, transmitting during the first TTI, includes transmitting the first message based on the first UL power limitation, and transmitting the second message based on the second UL power limitation with the applied adjustment factor. In some examples, the transmitter 515 may transmit an UL data message during the second DMRS window based at on the determination. In some examples, the transmitter 515 may transmit the UL data message during the second DMRS window based on the applied first or second TPC command. In some examples, the transmitter 515 may transmit a DMRS during the second DMRS window after transmitting the UL data message.

In some examples, the transmitter 515 may transmit a second UL data message after transmitting the DMRS, such that the second UL data message may be transmitted using the second TPC command based on the DMRS. In some examples, the transmitter 515 may transmit the UL data message during the second DMRS window based on the applied first or second TPC command.

Figure 6:
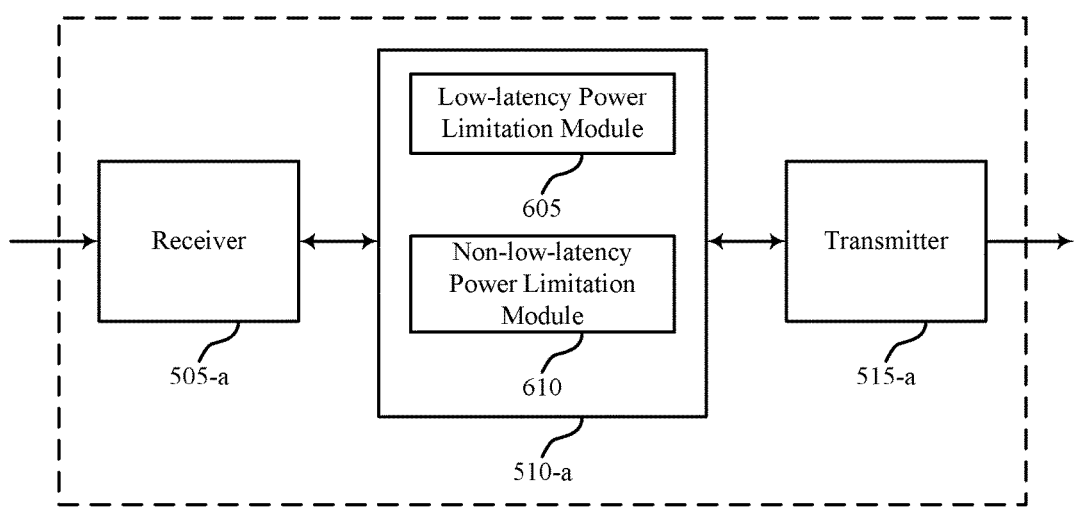

FIG. 6 shows a block diagram of a wireless device 600 that supports low latency UL power control in accordance with various aspects of the present disclosure. Wireless device 600 may be an example of aspects of a wireless device 500 or a UE 115 described with reference to FIGS. 1-5. Wireless device 600 may include a receiver 505-a, a low-latency power control module 510-a, or a transmitter 515-a. Wireless device 600 may also include a processor. Each of these components may be in communication with one another. The low-latency power control module 510-a may also include a low-latency power limitation module 605, and a non-low-latency power limitation module 610.

The receiver 505-a may receive information which may be passed on to low-latency power control module 510-a, and to other components of wireless device 600. The low-latency power control module 510-a may perform the operations described with reference to FIG. 5. The transmitter 515-a may transmit signals received from other components of wireless device 600.

The low-latency power limitation module 605 may determine a first UL power limitation for a first TTI duration based on a first power control parameter for the first TTI duration as described with reference to FIGS. 2-4. In some examples, the first transmit power limitation include a cell maximum transmit power parameter, a path loss parameter, a control transmission power parameter, a bandwidth parameter, a power offset parameter, a closed loop feedback parameter, a fractional power control parameter, or any combination thereof. In some examples, the power offset parameter and the fractional power control parameter are based on a low latency link budget.

The non-low-latency power limitation module 610 may determine a second UL power limitation for a second TTI duration based on a second power control parameter for the second TTI duration, and the second TTI duration may be greater than the first TTI duration as described with reference to FIGS. 2-4.

Figure 7:
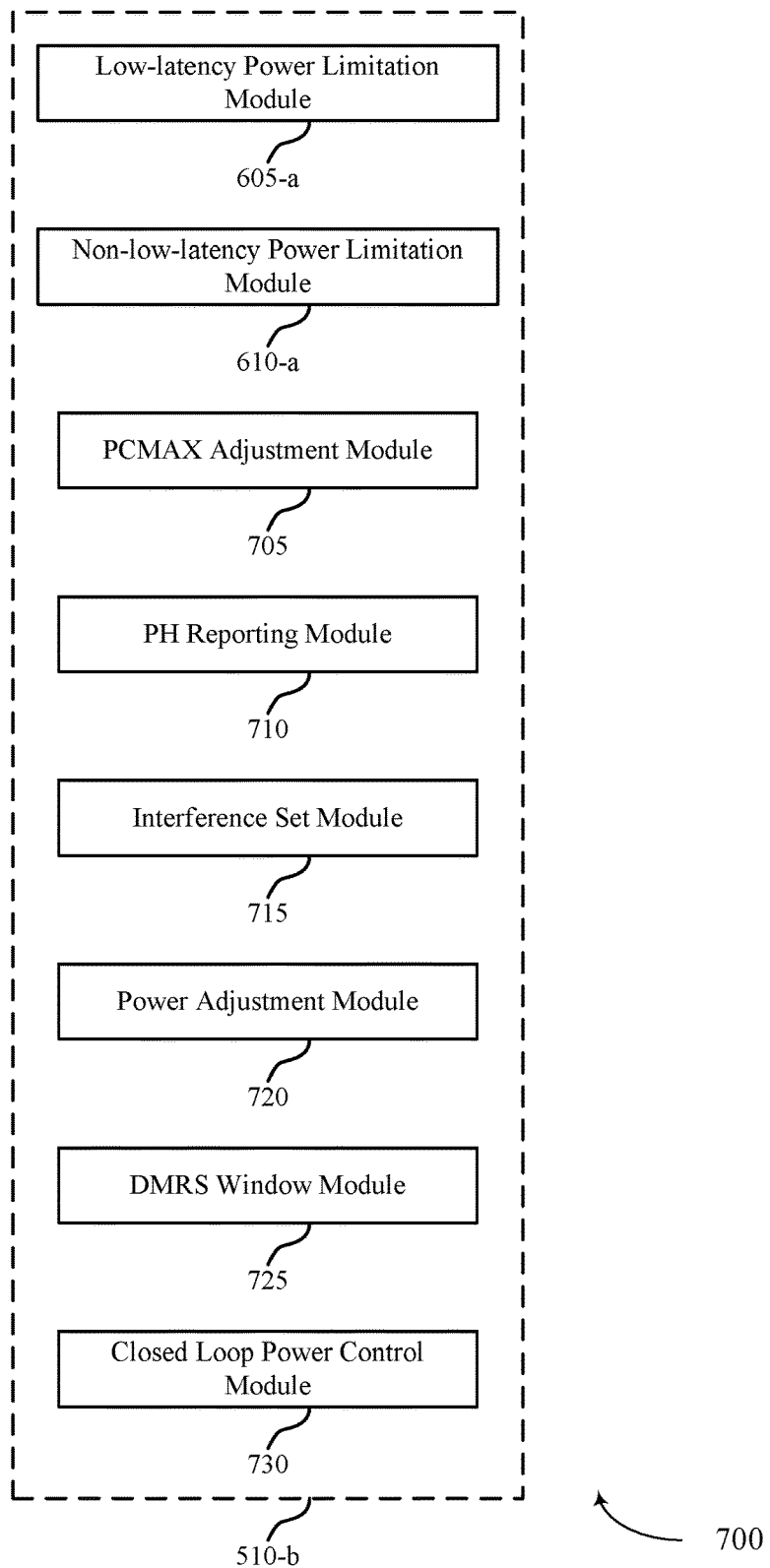

FIG. 7 shows a block diagram 700 of a low-latency power control module 510-b which may be a component of a wireless device 500 or a wireless device 600 that supports low latency UL power control in accordance with various aspects of the present disclosure. The low-latency power control module 510-b may be an example of aspects of a low-latency power control module 510 described with reference to FIGS. 5-6. The low-latency power control module 510-b may include a low-latency power limitation module 605-a, and a non-low-latency power limitation module 610-a. Each of these modules may perform the functions described with reference to FIG. 6. The low-latency power control module 510-b may also include a PCMAX adjustment module 705, a power headroom reporting module 710, an interference set module 715, a power adjustment module 720, a DMRS window module 725, and a closed loop power control module 730.

The PCMAX adjustment module 705 may adjust a cell maximum transmit power parameter of the first UL power limitation and the second UL power limitation based on the second TTI including the first TTI as described with reference to FIGS. 2-4.

The power headroom reporting module 710 may determine a first power headroom associated with the first TTI duration and a second power headroom associated with the second TTI duration as described with reference to FIGS. 2-4.

The interference set module 715 may identify a first set of subframes based on a first interference characteristic and a second set of subframes based on a second interference characteristic, as described with reference to FIGS. 2-4. The interference set module 715 may also maintain a first set of power control variables for the first set of subframes and a second set of power control variables for the second set of subframes, such that the first or second UL power limitation may be based on the first or second set of power control variables.

The power adjustment module 720 may determine whether a first message for the first TTI is scheduled to occur during a second message for a second TTI having the second TTI duration, and the second TTI may include the first TTI, as described with reference to FIGS. 2-4. The power adjustment module 720 may also apply an adjustment factor to the second UL power limitation for the second message based on whether the first message is determined to occur during the second message. In some examples, the adjustment factor may be based on a first power headroom associated with the first TTI duration and a second power headroom associated with the second TTI duration. In some examples, the adjustment factor may be calculated such that the sum of the first UL power limitation and the second UL power limitation with the adjustment factor may be equal to a cell maximum transmit power parameter. The power adjustment module 720 may also select the adjustment factor from a set of power backoffs. In some cases, the set of power backoffs includes a power limited low latency backoff, a non-power limited low latency backoff, a low latency backoff, a non-low latency backoff, or a combination of such backoff parameters.

The DMRS window module 725 may identify a first DMRS window and a second DMRS window, as described with reference to FIGS. 2-4. The DMRS window module 725 may also determine whether a second TPC command is received during the second DMRS window. The DMRS window module 725 may also determine that the UL data message is scheduled for an initial symbol period of the second DMRS window. The DMRS window module 725 may also determine that the UL data message is not scheduled for an initial symbol period of the second DMRS window. In some examples, determining whether a second DMRS has been received during the second DMRS window includes determining that the second DMRS has been received during the second DMRS window. While, in other examples, determining whether a second DMRS has been received during the second DMRS window includes determining that the second DMRS has not been received during the second DMRS window.

The closed loop power control module 730 may receive a first TPC command during the first DMRS window, as described with reference to FIGS. 2-4. The closed loop power control module 730 may also receive the second TPC command during the second DMRS window. The closed loop power control module 730 may apply the first TPC command based on the determination whether a UL data message is schedule for the initial symbol period of the second DMRS window. The closed loop power control module 730 may also receive the second TPC command during the second DMRS window. The closed loop power control module 730 may also apply the second TPC command based on the determination whether a UL data message is schedule for the initial symbol period of the second DMRS window.

Figure 8:
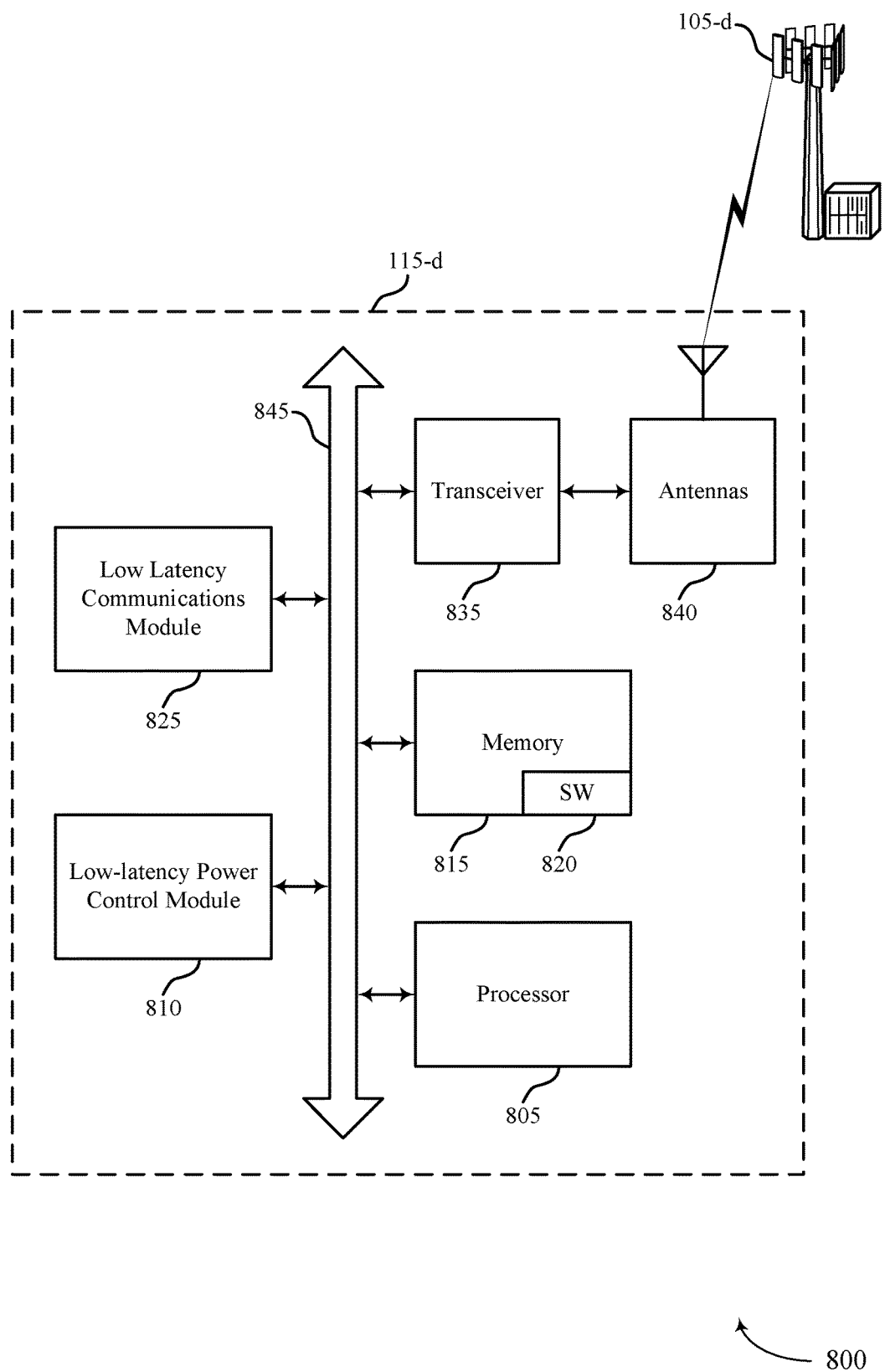
FIG. 8 illustrates a block diagram of a system, including a user equipment (UE), that supports low latency UL power control in accordance with various aspects of the present disclosure.

FIG. 8 shows a diagram of a system 800, including a UE, that supports low latency UL power control in accordance with various aspects of the present disclosure. System 800 may include UE 115-*d*, which may be an example of a wireless device 500, a wireless device 600, or a UE 115 described with reference to FIGS. 1, 2, and 5-7. UE 115-*d* may include a low-latency power control module 810, which may be an example of a low-latency power control module 510 described with reference to FIGS. 5-7. UE 115-*d* may also include a low latency communications module 825. UE 115-*d* may also include components for bi-directional voice and data communications including components for transmitting communications and components for receiving communications. For example, UE 115-*d* may communicate bi-directionally with base station 105-*d*.

Low latency communications module 825 may coordinate low latency communications as described with reference to FIG. 1. UE 115-*d* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., low latency UL power control, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
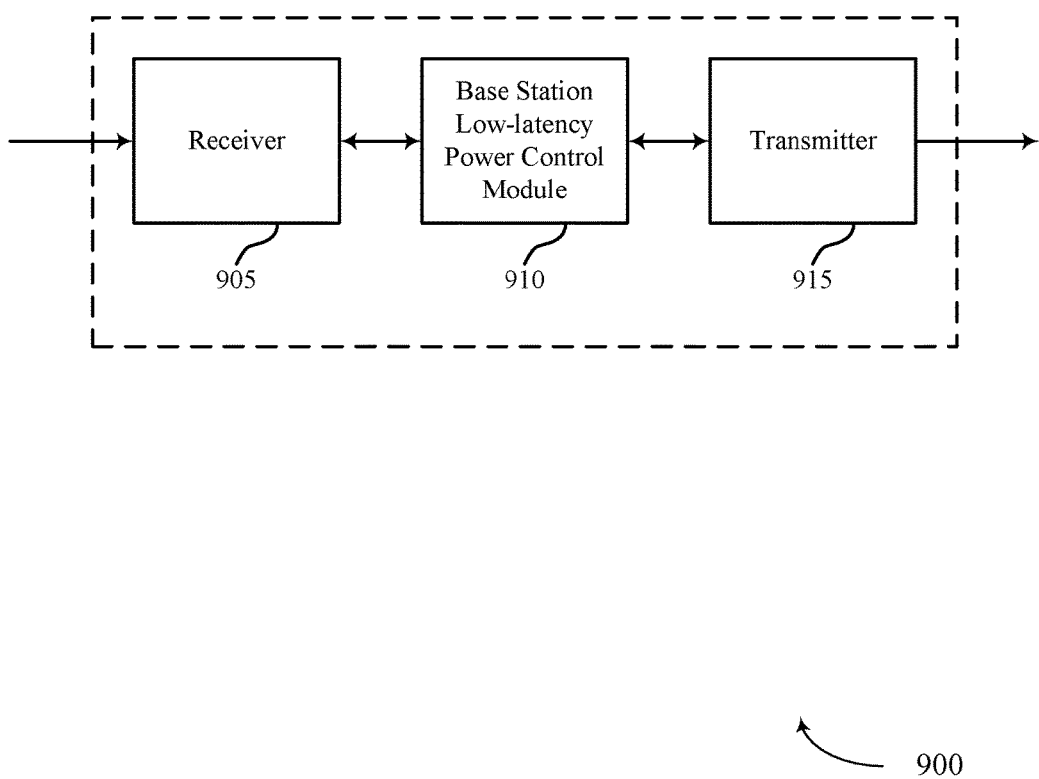
FIGS. 9-11 show block diagrams of a wireless device or devices that support low latency UL power control in accordance with various aspects of the present disclosure.

FIG. 9 shows a block diagram of a wireless device 900 that supports low latency UL power control in accordance with various aspects of the present disclosure. Wireless device 900 may be an example of aspects of a base station 105 described with reference to FIGS. 1-4 and 8. Wireless device 900 may include a receiver 905, a base station low-latency power control module 910, or a transmitter 915. Wireless device 900 may also include a processor. Each of these components may be in communication with one another.

The receiver 905 may receive information such as packets, user data, or control information associated with various information channels (e.g., control channels, data channels, and information related to low latency UL power control, etc.). Information may be passed on to the base station low-latency power control module 910, and to other components of wireless device 900. In some examples, the receiver 905 may receive a first UL transmission according to the first TTI duration based on the first power control parameter and a second UL transmission according to the second TTI duration based on the second power control parameter. In some examples, the receiver 905 may receive an UL data message during the second DMRS window.

The base station low-latency power control module 910 may transmit a first power control parameter associated with a first TTI duration, transmit a second power control parameter associated with a second TTI duration, and the second TTI duration may be greater than the first TTI duration, and receive a first UL transmission according to the first TTI duration based on the first power control parameter and a second UL transmission according to the second TTI duration based on the second power control parameter.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
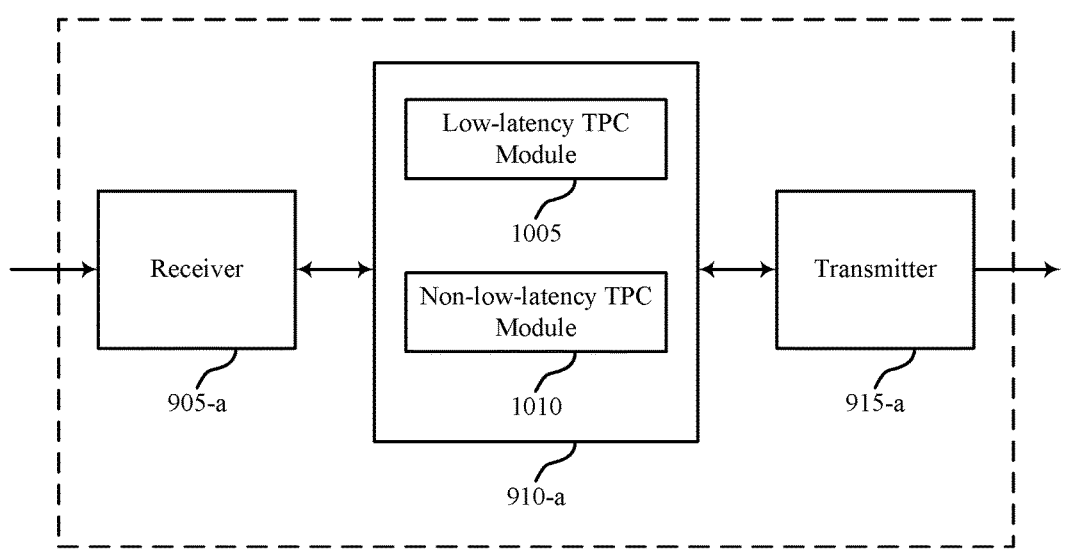

FIG. 10 shows a block diagram of a wireless device 1000 that supports low latency UL power control in accordance with various aspects of the present disclosure. Wireless device 1000 may be an example of aspects of a wireless device 900 or a base station 105 described with reference to FIGS. 1-4, 8, and 9. Wireless device 1000 may include a receiver 905-a, a base station low-latency power control module 910-a, or a transmitter 915-a. Wireless device 1000 may also include a processor. Each of these components may be in communication with one another. The base station low-latency power control module 910-a may also include a low-latency TPC module 1005 and a non-low-latency TPC module 1010.

The receiver 905-a may receive information which may be passed on to base station low-latency power control module 910-a, and to other components of wireless device 1000. The base station low-latency power control module 910-a may perform the operations described with reference to FIG. 9. The transmitter 915-a may transmit signals received from other components of wireless device 1000.

The low-latency TPC module 1005 may transmit a first power control parameter associated with a first TTI duration as described with reference to FIGS. 2-4. The low-latency TPC module 1005 may also transmit a first TPC command during the first DMRS window.

The non-low-latency TPC module 1010 may transmit a second power control parameter associated with a second TTI duration; the second TTI duration is greater than the first TTI duration as described with reference to FIGS. 2-4.

Figure 11:
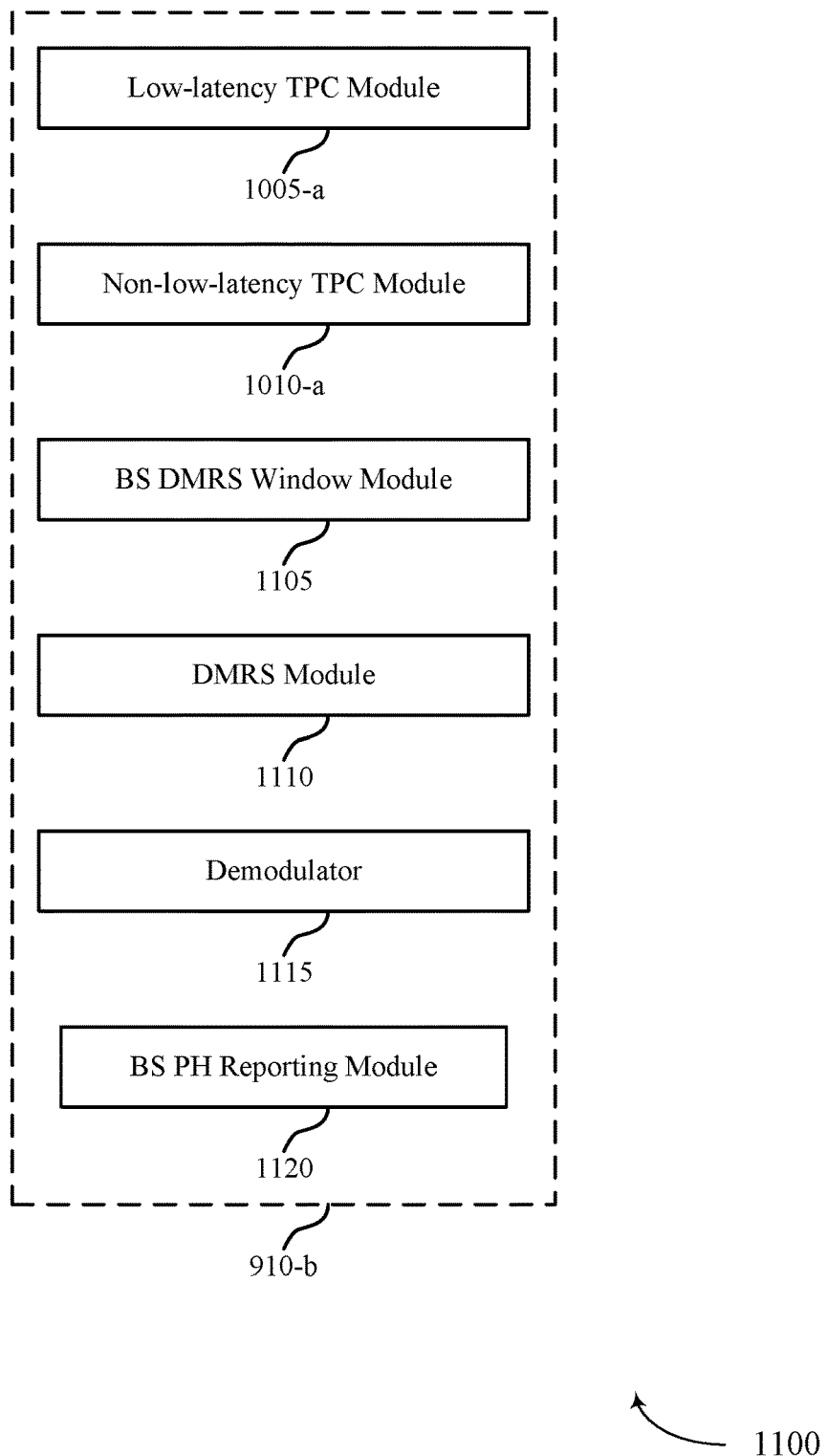

FIG. 11 shows a block diagram 1100 of a base station low-latency power control module 910-b which may be a component of a wireless device 900 or a wireless device 1000 for low latency UL power control in accordance with various aspects of the present disclosure. The base station low-latency power control module 910-b may be an example of aspects of a base station low-latency power control module 910 described with reference to FIGS. 9-10. The base station low-latency power control module 910-b may include a low-latency TPC module 1005-a, a non-low-latency TPC module 1010-a, a base station DMRS window module 1105, a DMRS module 1110, and a demodulator 1115. Each of these modules may perform the functions described with reference to FIG. 10. The base station low-latency power control module 910-b may also include and a base station power headroom reporting module 1120.

The base station DMRS window module 1105 may identify a first DMRS window and a second DMRS window as described with reference to FIGS. 2-4.

The DMRS module 1110 may receive a first DMRS during the first DMRS window based on the first TPC command as described with reference to FIGS. 2-4. The DMRS module 1110 may also determine whether a second DMRS has been received during the second DMRS window.

The demodulator 1115 may demodulate the UL data message using the first or second DMRS based on the determination as described with reference to FIGS. 2-4. In some examples, the UL data message may be demodulated based on the second DMRS. In some examples, the UL data message may be demodulated based on the second DMRS.

The base station power headroom reporting module 1120 may receive a first power headroom report indicative of a first power headroom associated with the first TTI duration together with a second power headroom report indicative of a second power headroom associated with the second TTI duration as described with reference to FIGS. 2-4.

Figure 12:
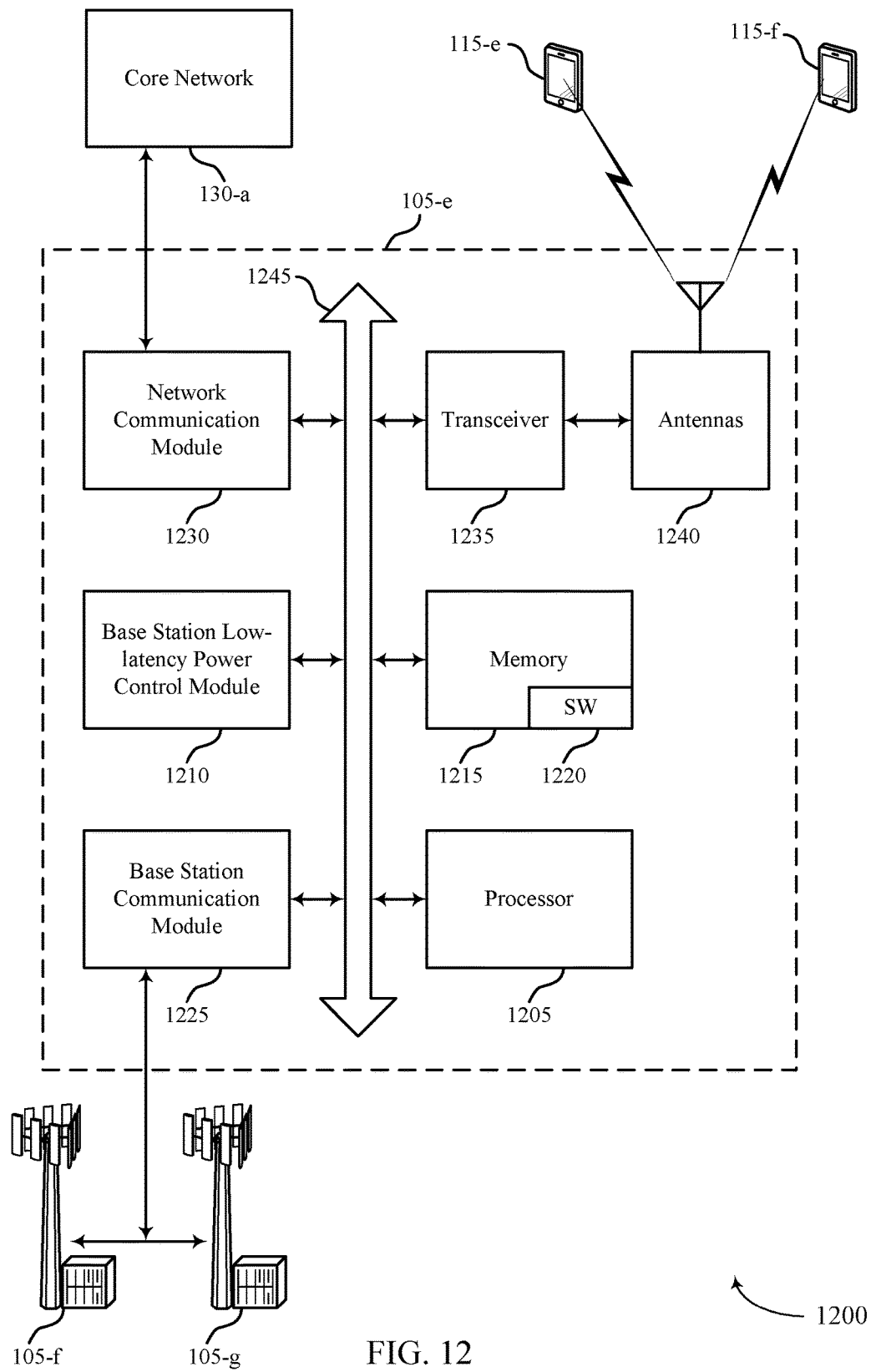
FIG. 12 illustrates a block diagram of a system, including a base station, that supports low latency UL power control in accordance with various aspects of the present disclosure.

FIG. 12 shows a diagram of a system 1200 including a base station 105 configured for low latency UL power control in accordance with various aspects of the present disclosure. System 1200 may include base station 105-e, which may be an example of a wireless device 900, a wireless device 1000, or a base station 105 described with reference to FIGS. 1, 2 and 9-11. Base station 105-e may include a base station low-latency power control module 1210, which may be an example of a base station low-latency power control module 910 described with reference to FIGS. 9-11. Base station 105-e may also include components for bi-directional voice and data communications including components for transmitting communications and components for receiving communications. For example, base station 105-e may communicate bi-directionally with UE 115-e or UE 115-f.

In some cases, base station 105-e may have one or more wired backhaul links. Base station 105-e may have a wired backhaul link (e.g., S1 interface, etc.) to the core network 130. Base station 105-e may also communicate with other base stations 105, such as base station 105-f and base station 105-g via inter-base station backhaul links (e.g., an X2 interface). Each of the base stations 105 may communicate with UEs 115 using the same or different wireless communications technologies. In some cases, base station 105-e may communicate with other base stations such as 105-f or 105-g utilizing base station communication module 1225. In some examples, base station communication module 1225 may provide an X2 interface within an LTE/LTE-A wireless communication network technology to provide communication between some of the base stations 105. In some examples, base station 105-e may communicate with other base stations through core network 130. In some cases, base station 105-e may communicate with the core network 130 through network communication module 1230.

The base station 105-e may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-e) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-*e* may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., low latency UL power control, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communication module 1225 may manage communications with other base stations 105. In some cases, a communications management module may include a controller or scheduler for controlling communications with UEs 115 in cooperation with other base stations 105. For example, the base station communication module 1225 may coordinate scheduling for transmissions to UEs 115 for various interference mitigation techniques such as beamforming or joint transmission.

The components of wireless device 500, wireless device 600, low-latency power control module 510, wireless device 900, wireless device 1000, and system 1200 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
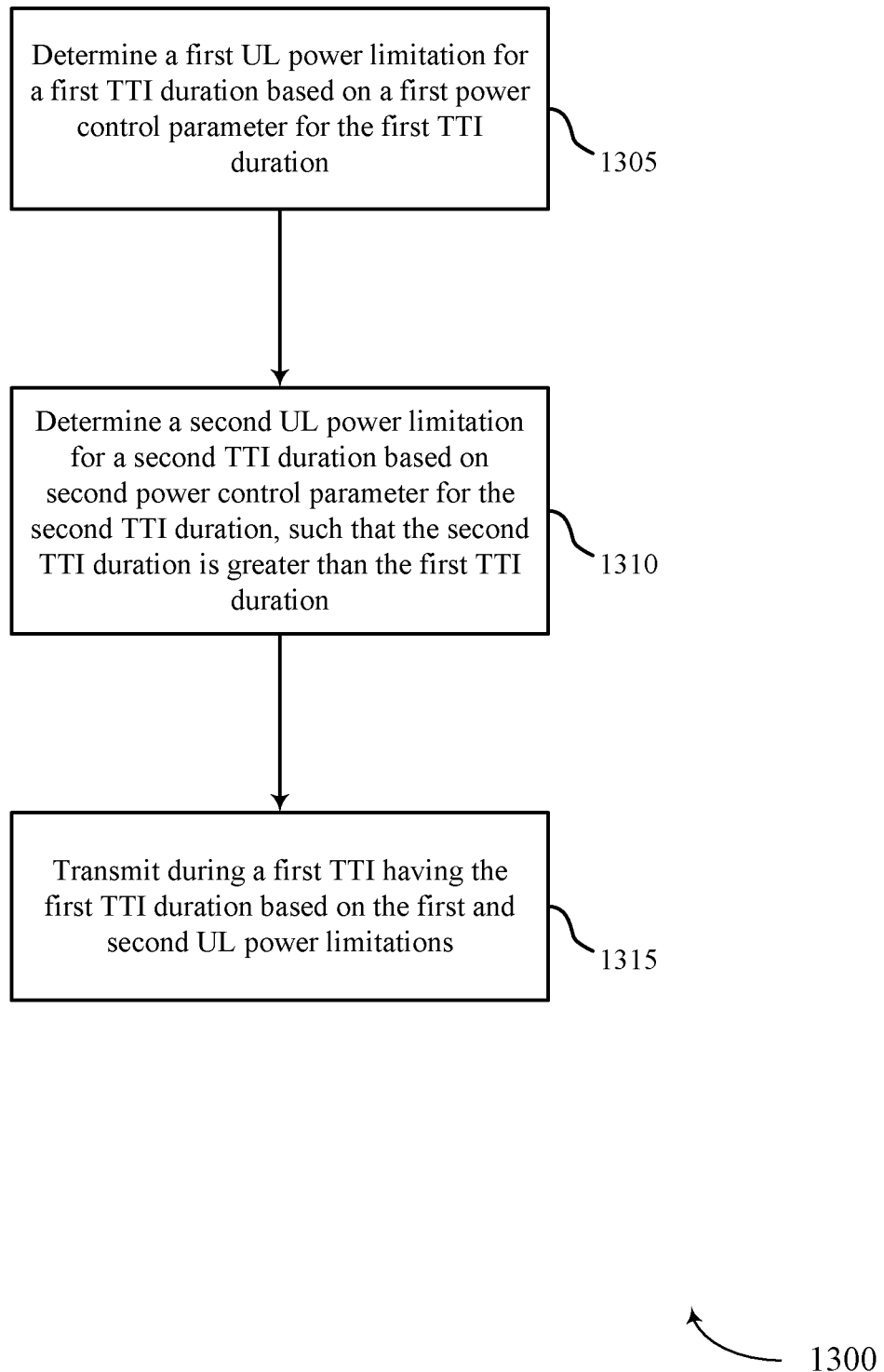
FIGS. 13-20 illustrate methods for low latency UL power control in accordance with various aspects of the present disclosure.

FIG. 13 shows a flowchart illustrating a method 1300 for low latency UL power control in accordance with various aspects of the present disclosure. The operations of method 1300 may be implemented by a UE 115 or its components as described with reference to FIGS. 1-12. For example, the operations of method 1300 may be performed by the low-latency power control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may determine a first UL power limitation for a first TTI duration based at least in part on a first power control parameter for the first TTI duration as described with reference to FIGS. 2-4. In certain examples, the operations of block 1305 may be performed by the low-latency power limitation module 605 as described with reference to FIG. 6.

At block 1310, the UE 115 may determine a second UL power limitation for a second TTI duration based at least in part on second power control parameter for the second TTI duration, such that the second TTI duration is greater than the first TTI duration as described with reference to FIGS. 2-4. In certain examples, the operations of block 1310 may be performed by the non-low-latency power limitation module 610 as described with reference to FIG. 6.

At block 1315, the UE 115 may transmit during a first TTI having the first TTI duration based at least in part on the first and second UL power limitations as described with reference to FIGS. 2-4. In certain examples, the operations of block 1315 may be performed by the transmitter 515 as described with reference to FIG. 5.

Figure 14:
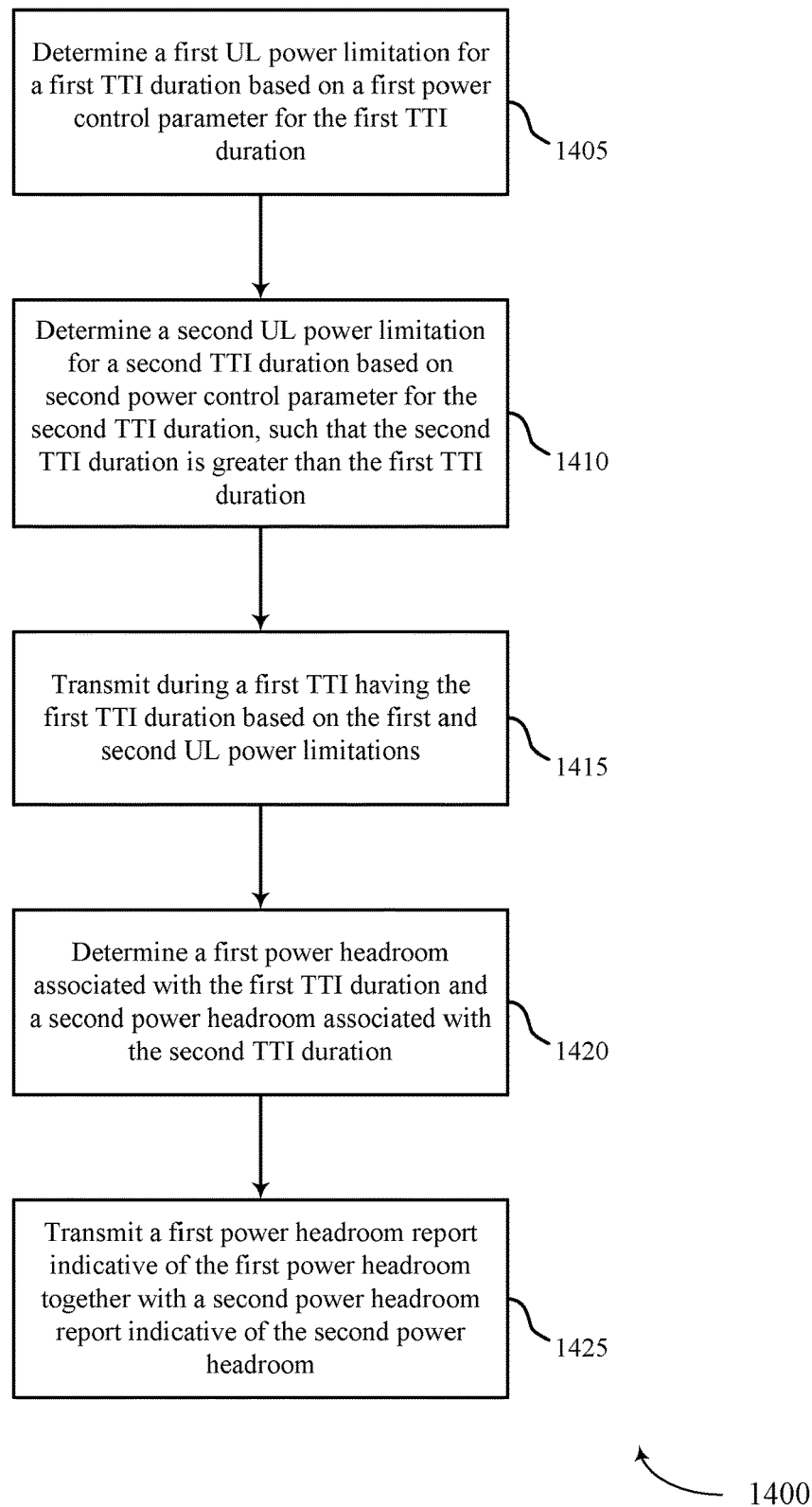

FIG. 14 shows a flowchart illustrating a method 1400 for low latency UL power control in accordance with various aspects of the present disclosure. The operations of method 1400 may be implemented by a UE 115 or its components as described with reference to FIGS. 1-12. For example, the operations of method 1400 may be performed by the low-latency power control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may determine a first UL power limitation for a first TTI duration based at least in part on a first power control parameter for the first TTI duration as described with reference to FIGS. 2-4. In certain examples, the operations of block 1405 may be performed by the low-latency power limitation module 605 as described with reference to FIG. 6.

At block 1410, the UE 115 may determine a second UL power limitation for a second TTI duration based at least in part on second power control parameter for the second TTI duration, such that the second TTI duration is greater than the first TTI duration as described with reference to FIGS. 2-4. In certain examples, the operations of block 1410 may be performed by the non-low-latency power limitation module 610 as described with reference to FIG. 6.

At block 1415, the UE 115 may transmit during a first TTI having the first TTI duration based at least in part on the first and second UL power limitations as described with reference to FIGS. 2-4. In certain examples, the operations of block 1415 may be performed by the transmitter 515 as described with reference to FIG. 5.

At block 1420, the UE 115 may determine a first power headroom associated with the first TTI duration and a second power headroom associated with the second TTI duration as described with reference to FIGS. 2-4. In certain examples, the operations of block 1420 may be performed by the power headroom reporting module 710 as described with reference to FIG. 7.

At block 1425, the UE 115 may transmit a first power headroom report indicative of a first power headroom together with a second power headroom report indicative of a second power headroom as described with reference to FIGS. 2-4. In certain examples, the operations of block 1425 may be performed by the transmitter 515 as described with reference to FIG. 5.

Figure 15:
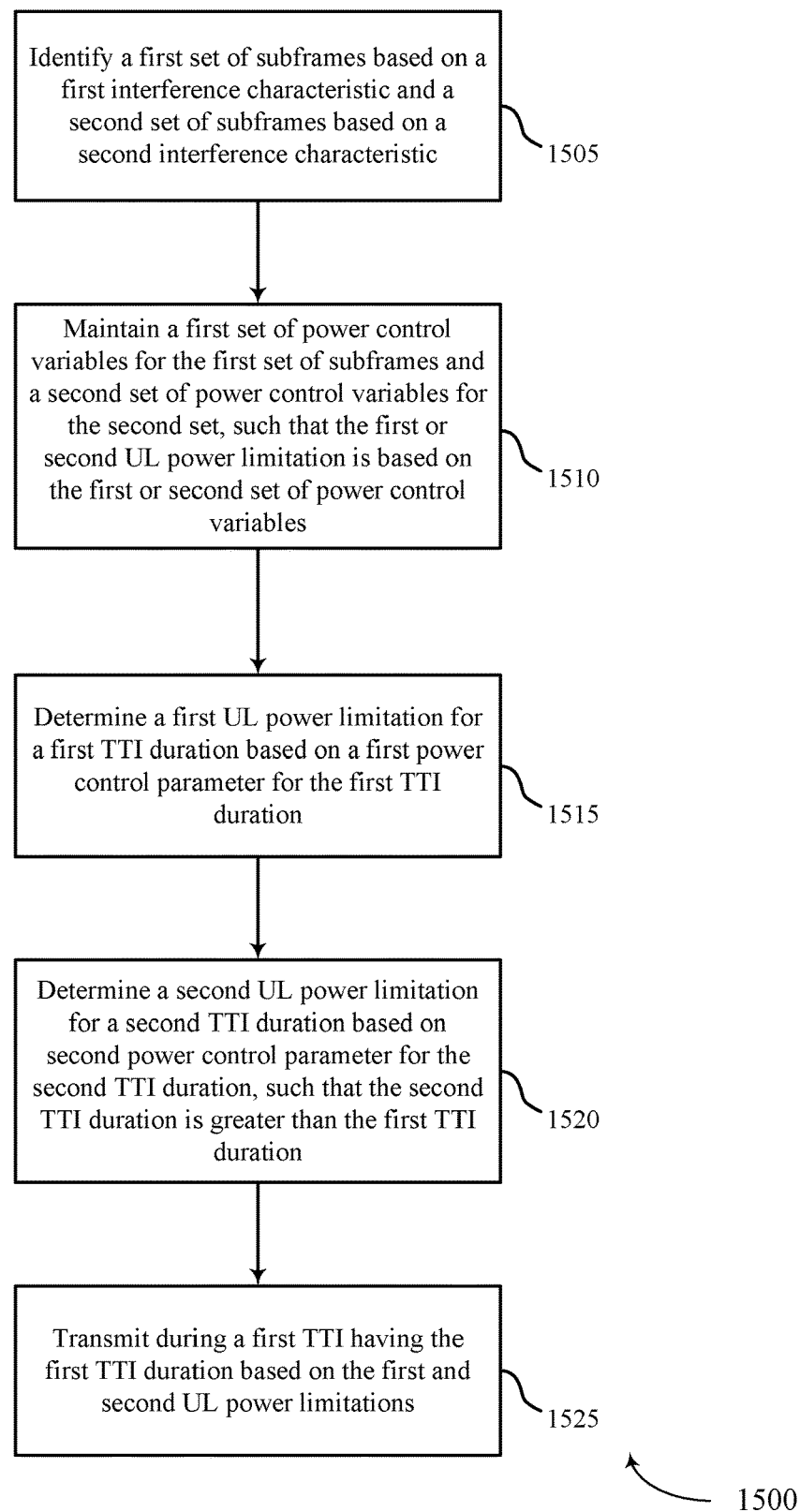

FIG. 15 shows a flowchart illustrating a method 1500 for low latency UL power control in accordance with various aspects of the present disclosure. The operations of method 1500 may be implemented by a UE 115 or its components as described with reference to FIGS. 1-12. For example, the operations of method 1500 may be performed by the low-latency power control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may identify a first set of subframes based at least in part on a first interference characteristic and a second set of subframes based at least in part on a second interference characteristic as described with reference to FIGS. 2-4. In certain examples, the operations of block 1505 may be performed by the interference set module 715 as described with reference to FIG. 7.

At block 1510, the UE 115 may maintain a first set of power control variables for the first set of subframes and a second set of power control variables for the second set of subframes, such that the first or second UL power limitation is based at least in part on the first or second set of power control variables as described with reference to FIGS. 2-4. In certain examples, the operations of block 1510 may be performed by the interference set module 715 as described with reference to FIG. 7.

At block 1515, the UE 115 may determine a first UL power limitation for a first TTI duration based at least in part on a first power control parameter for the first TTI duration as described with reference to FIGS. 2-4. In certain examples, the operations of block 1515 may be performed by the low-latency power limitation module 605 as described with reference to FIG. 6.

At block 1520, the UE 115 may determine a second UL power limitation for a second TTI duration based at least in part on second power control parameter for the second TTI duration, such that the second TTI duration is greater than the first TTI duration as described with reference to FIGS. 2-4. In certain examples, the operations of block 1520 may be performed by the non-low-latency power limitation module 610 as described with reference to FIG. 6.

At block 1525, the UE 115 may transmit during a first TTI having the first TTI duration based at least in part on the first and second UL power limitations as described with reference to FIGS. 2-4. In certain examples, the operations of block 1525 may be performed by the transmitter 515 as described with reference to FIG. 5.

Figure 16:
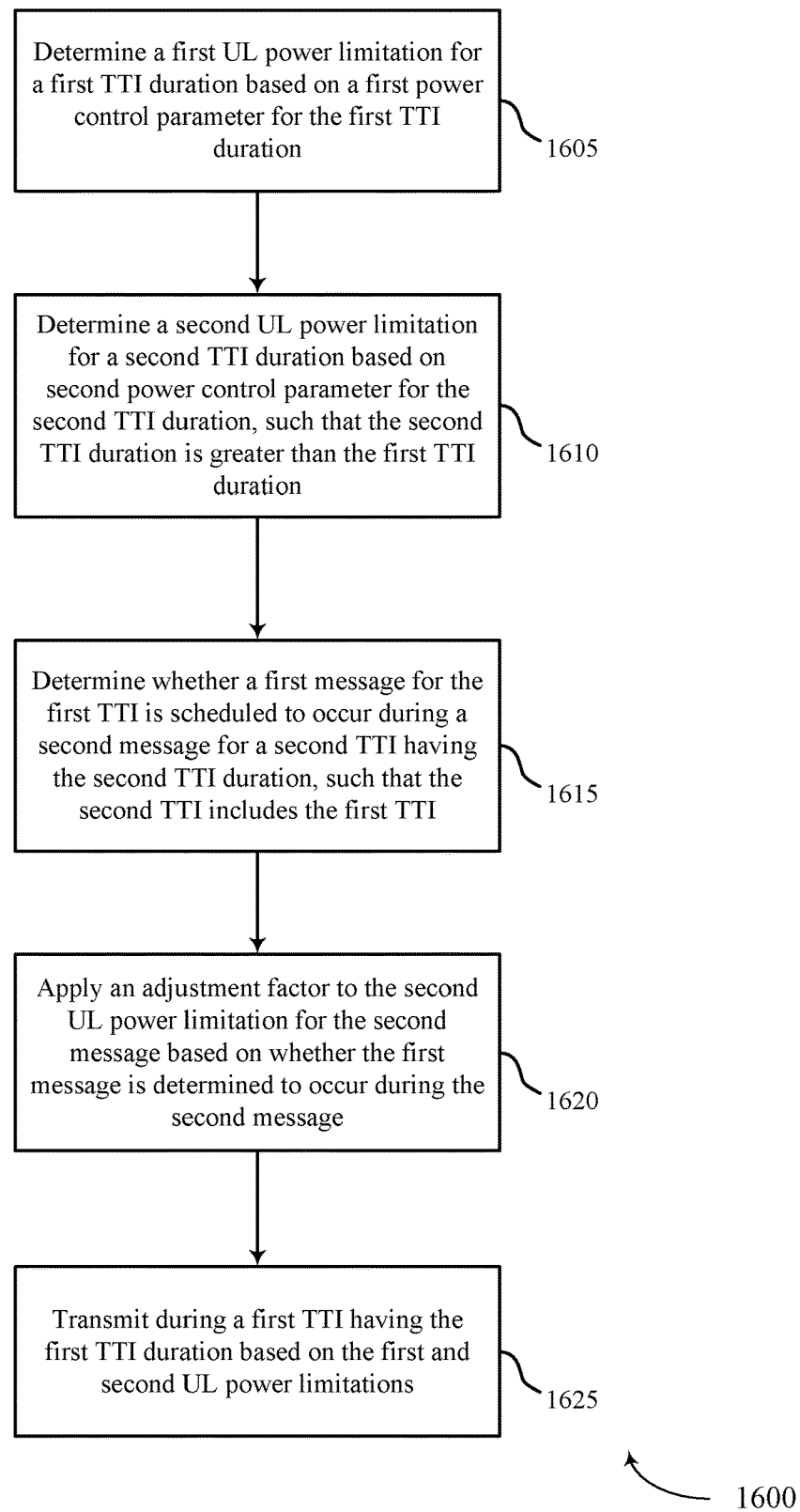

FIG. 16 shows a flowchart illustrating a method 1600 for low latency UL power control in accordance with various aspects of the present disclosure. The operations of method 1600 may be implemented by a UE 115 or its components as described with reference to FIGS. 1-12. For example, the operations of method 1600 may be performed by the low-latency power control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may determine a first UL power limitation for a first TTI duration based at least in part on a first power control parameter for the first TTI duration as described with reference to FIGS. 2-4. In certain examples, the operations of block 1605 may be performed by the low-latency power limitation module 605 as described with reference to FIG. 6.

At block 1610, the UE 115 may determine a second UL power limitation for a second TTI duration based at least in part on second power control parameter for the second TTI duration, such that the second TTI duration is greater than the first TTI duration as described with reference to FIGS. 2-4. In certain examples, the operations of block 1610 may be performed by the non-low-latency power limitation module 610 as described with reference to FIG. 6.

At block 1615, the UE 115 may determine whether a first message for the first TTI is scheduled to occur during a second message for a second TTI having the second TTI duration, such that the second TTI includes the first TTI as described with reference to FIGS. 2-4. In certain examples, the operations of block 1615 may be performed by the power adjustment module 720 as described with reference to FIG. 7.

At block 1620, the UE 115 may apply an adjustment factor to the second UL power limitation for the second message based at least in part on whether the first message is determined to occur during the second message as described with reference to FIGS. 2-4. In certain examples, the operations of block 1620 may be performed by the power adjustment module 720 as described with reference to FIG. 7.

At block 1625, the UE 115 may transmit during a first TTI having the first TTI duration based at least in part on the first and second UL power limitations as described with reference to FIGS. 2-4. In certain examples, the operations of block 1625 may be performed by the transmitter 515 as described with reference to FIG. 5.

Figure 17:
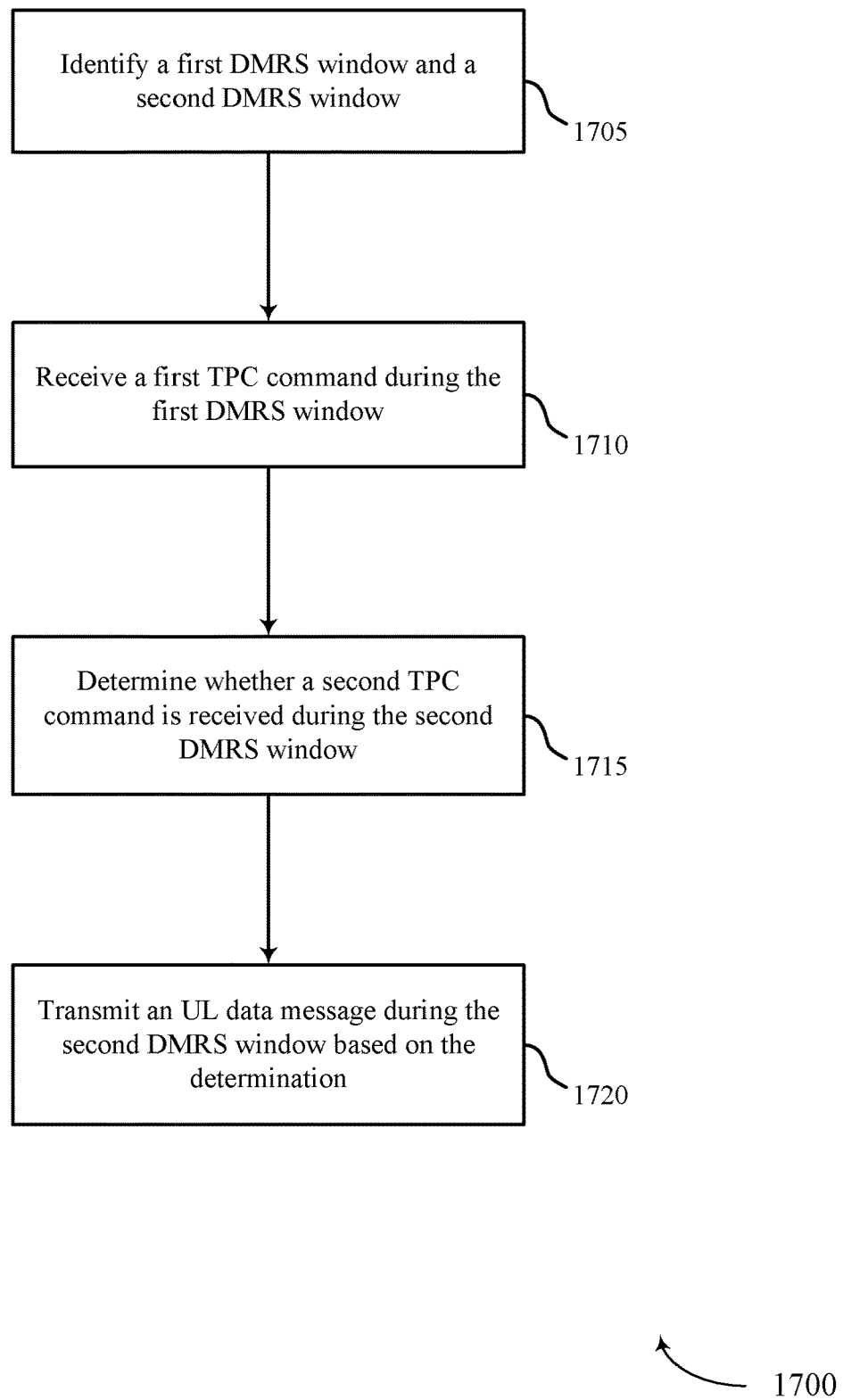

FIG. 17 shows a flowchart illustrating a method 1700 for low latency UL power control in accordance with various aspects of the present disclosure. The operations of method 1700 may be implemented by a UE 115 or its components as described with reference to FIGS. 1-12. For example, the operations of method 1700 may be performed by the low-latency power control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1300, 1400, 1500, and 1600 of FIGS. 13-16.

At block 1705, the UE 115 may identify a first DMRS window and a second DMRS window as described with reference to FIGS. 2-4. In certain examples, the operations of block 1705 may be performed by the DMRS window module 725 as described with reference to FIG. 7.

At block 1710, the UE 115 may receive a first TPC command during the first DMRS window as described with reference to FIGS. 2-4. In certain examples, the operations of block 1710 may be performed by the closed loop power control module 730 as described with reference to FIG. 7.

At block 1715, the UE 115 may determine whether a second TPC command is received during the second DMRS window as described with reference to FIGS. 2-4. In certain examples, the operations of block 1715 may be performed by the DMRS window module 725 as described with reference to FIG. 7.

At block 1720, the UE 115 may transmit an UL data message during the second DMRS window based at least in part on the determination as described with reference to FIGS. 2-4. In certain examples, the operations of block 1720 may be performed by the transmitter 515 as described with reference to FIG. 5.

Figure 18:
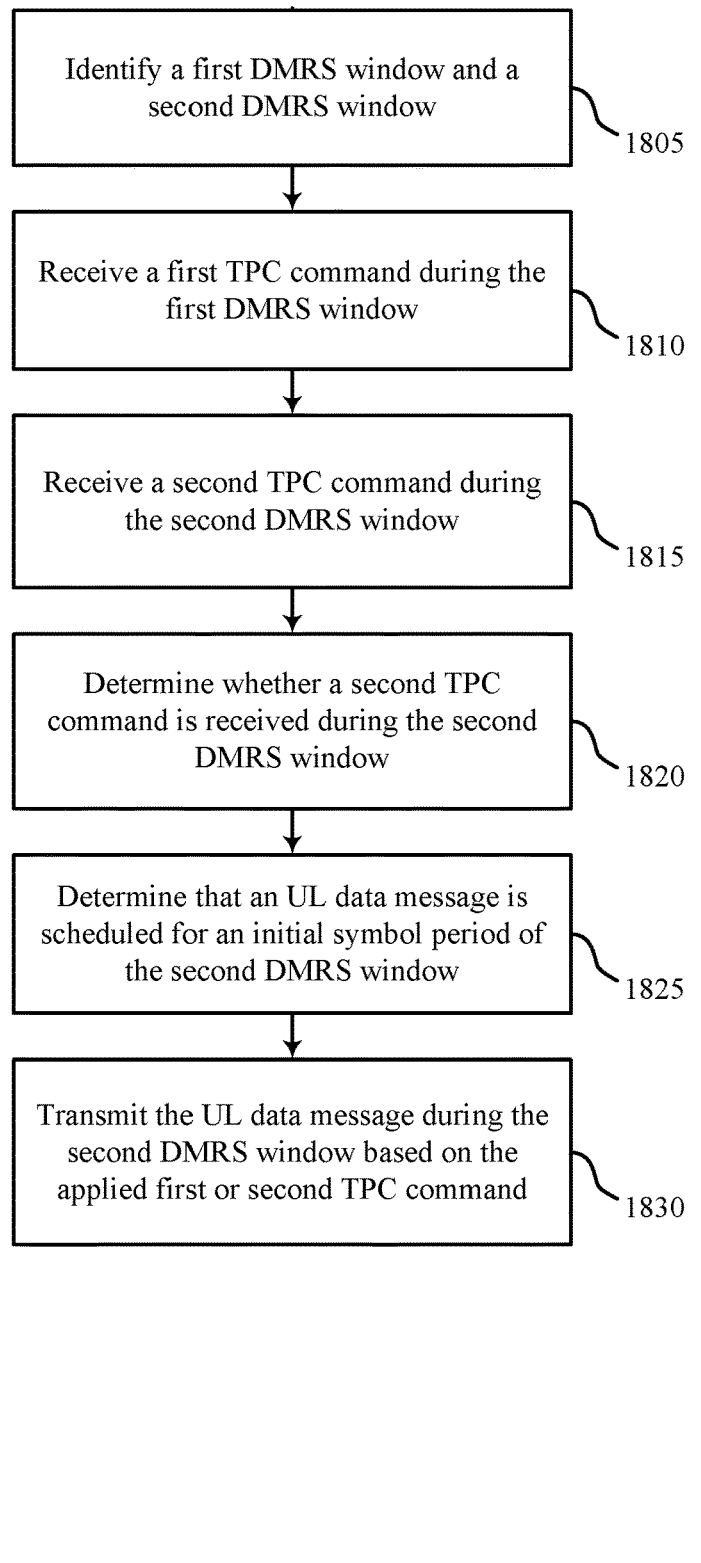

FIG. 18 shows a flowchart illustrating a method 1800 for low latency UL power control in accordance with various aspects of the present disclosure. The operations of method 1800 may be implemented by a UE 115 or its components as described with reference to FIGS. 1-12. For example, the operations of method 1800 may be performed by the low-latency power control module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1300, 1400, 1500, 1600, and 1700 of FIGS. 13-17.

At block 1805, the UE 115 may identify a first DMRS window and a second DMRS window as described with reference to FIGS. 2-4. In certain examples, the operations of block 1805 may be performed by the DMRS window module 725 as described with reference to FIG. 7.

At block 1810, the UE 115 may receive a first TPC command during the first DMRS window as described with reference to FIGS. 2-4. In certain examples, the operations of block 1810 may be performed by the closed loop power control module 730 as described with reference to FIG. 7.

At block 1815, the UE 115 may receive the second TPC command during the second DMRS window as described with reference to FIGS. 2-4. In certain examples, the operations of block 1815 may be performed by the closed loop power control module 730 as described with reference to FIG. 7.

At block 1820, the UE 115 may determine whether the second TPC command is received during the second DMRS window as described with reference to FIGS. 2-4. In certain examples, the operations of block 1820 may be performed by the DMRS window module 725 as described with reference to FIG. 7.

At block 1825, the UE 115 may determine that an UL data message is scheduled for an initial symbol period of the second DMRS window as described with reference to FIGS. 2-4. In certain examples, the operations of block 1825 may be performed by the DMRS window module 725 as described with reference to FIG. 7.

At block 1830, the UE 115 may transmit the UL data message during the second DMRS window based at least in part on the determination whether UL data message is scheduled for the initial symbol periods or whether a second TPC command is received in the second DMRS window, or both, as described with reference to FIGS. 2-4. In certain examples, the operations of block 1830 may be performed by the transmitter 515 as described with reference to FIG. 5.

Figure 19:
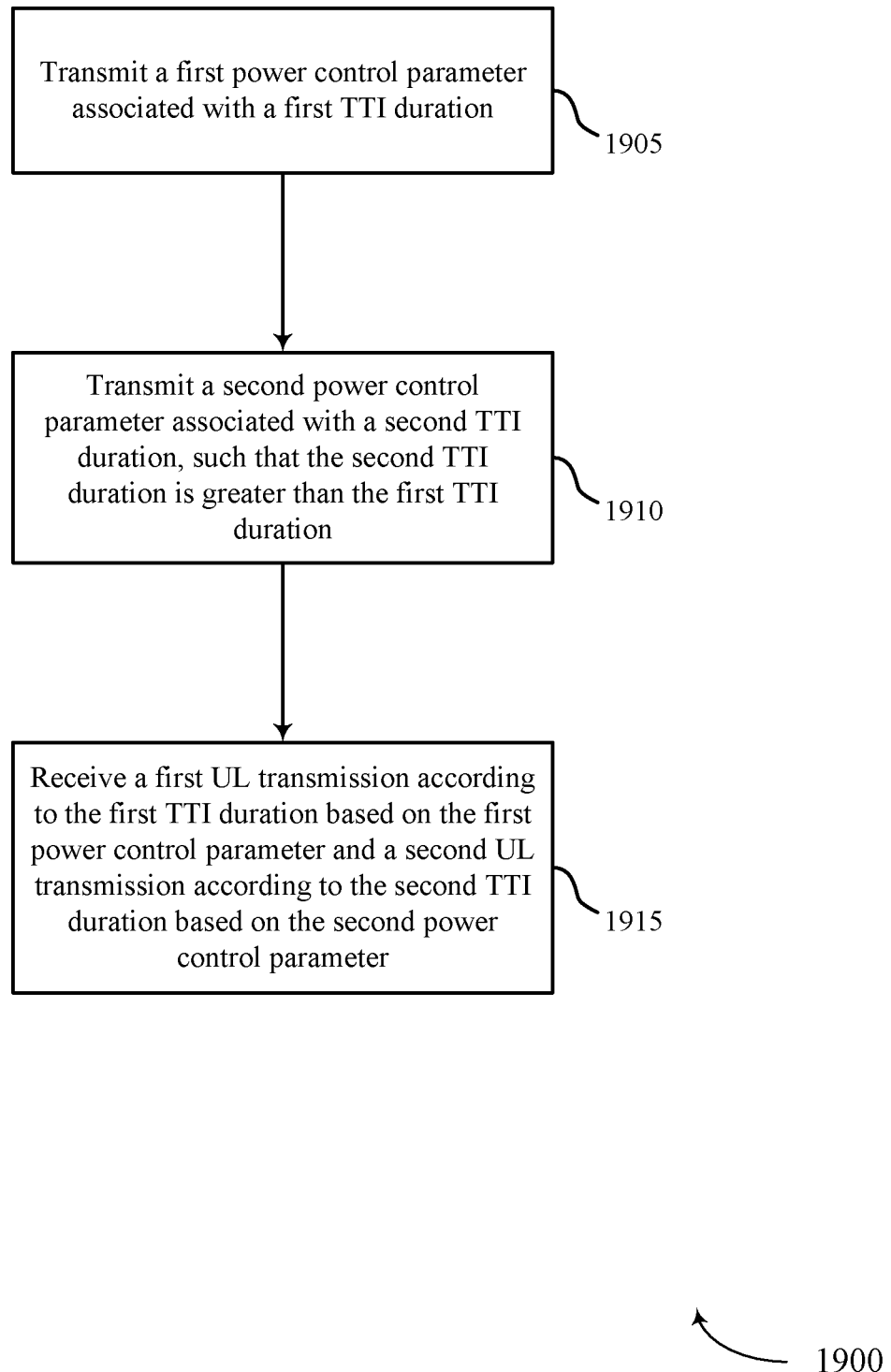

FIG. 19 shows a flowchart illustrating a method 1900 for low latency UL power control in accordance with various aspects of the present disclosure. The operations of method 1900 may be implemented by a base station 105 or its components as described with reference to FIGS. 1-12. For example, the operations of method 1900 may be performed by the base station low-latency power control module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of methods 1300, 1400, 1500, 1600, 1700, and 1800 of FIGS. 13-18.

At block 1905, the base station 105 may transmit a first power control parameter associated with a first TTI duration as described with reference to FIGS. 2-4. In certain examples, the operations of block 1905 may be performed by the low-latency TPC module 1005 as described with reference to FIG. 10.

At block 1910, the base station 105 may transmit a second power control parameter associated with a second TTI duration, such that the second TTI duration is greater than the first TTI duration as described with reference to FIGS. 2-4. In certain examples, the operations of block 1910 may be performed by the non-low-latency TPC module 1010 as described with reference to FIG. 10.

At block 1915, the base station 105 may receive a first UL transmission according to the first TTI duration based at least in part on the first power control parameter and a second UL transmission according to the second TTI duration based at least in part on the second power control parameter as described with reference to FIGS. 2-4. In certain examples, the operations of block 1915 may be performed by the receiver 905 as described with reference to FIG. 9.

Figure 20:
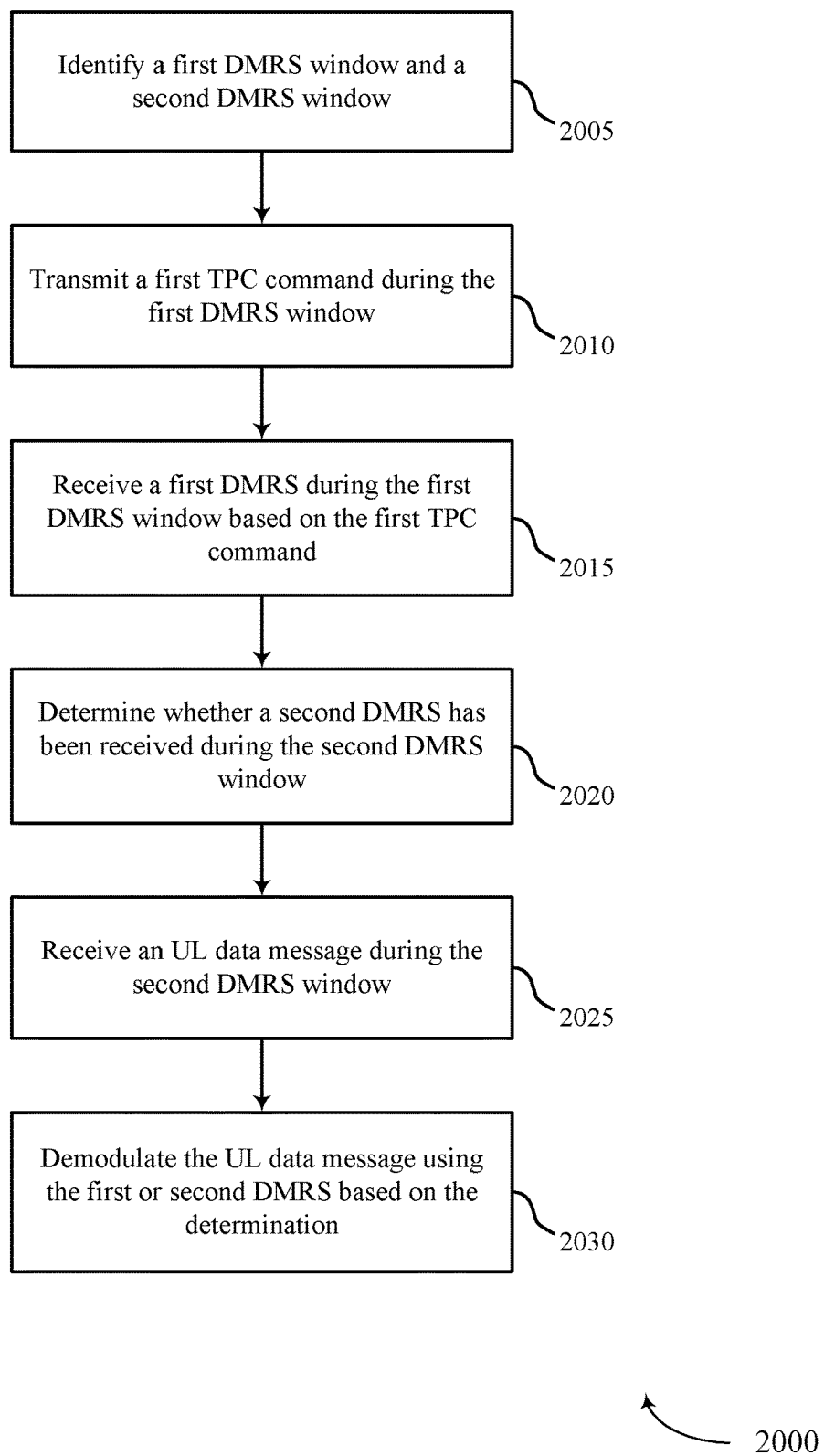

FIG. 20 shows a flowchart illustrating a method 2000 for low latency UL power control in accordance with various aspects of the present disclosure. The operations of method 2000 may be implemented by a base station 105 or its components as described with reference to FIGS. 1-12. For example, the operations of method 2000 may be performed by the base station low-latency power control module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 2000 may also incorporate aspects of methods 1300, 1400, 1500, 1600, 1700, 1800, and 1900 of FIGS. 13-19.

At block 2005, the base station 105 may identify a first DMRS window and a second DMRS window as described with reference to FIGS. 2-4. In certain examples, the operations of block 2005 may be performed by the DMRS window module 725 as described with reference to FIG. 7.

At block 2010, the base station 105 may transmit a first TPC command during the first DMRS window as described with reference to FIGS. 2-4. In certain examples, the operations of block 2010 may be performed by the low-latency TPC module 1005 as described with reference to FIG. 10.

At block 2015, the base station 105 may receive a first DMRS during the first DMRS window based at least in part on the first TPC command as described with reference to FIGS. 2-4. In certain examples, the operations of block 2015 may be performed by the DMRS module 1110 as described with reference to FIG. 10.

At block 2020, the base station 105 may determine whether a second DMRS has been received during the second DMRS window as described with reference to FIGS. 2-4. In certain examples, the operations of block 2020 may be performed by the DMRS module 1110 as described with reference to FIG. 10.

At block 2025, the base station 105 may receive an UL data message during the second DMRS window as described with reference to FIGS. 2-4. In certain examples, the operations of block 2025 may be performed by the receiver 905 as described with reference to FIG. 9.

At block 2030, the base station 105 may demodulate the UL data message using the first or second DMRS based at least in part on the determination as described with reference to FIGS. 2-4. In certain examples, the operations of block 2030 may be performed by the demodulator 1115 as described with reference to FIG. 10.

Thus, methods 1300, 1400, 1500, 1600, 1700, 1800, 1900, and 2000 may provide for low latency UL power control. It should be noted that methods 1300, 1400, 1500, 1600, 1700, 1800, 1900, and 2000 describe possible implementation, and that the operations and the steps may be rearranged or otherwise modified such that other implementations are possible. In some examples, aspects from two or more of the methods 1300, 1400, 1500, 1600, 1700, 1800, 1900, and 2000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). "3rd Generation Partnership Project" (3GPP) LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of or" "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   determining a first uplink (UL) power limitation for a first transmission time interval (TTI) duration based at least in part on a first power control parameter for the first TTI duration;
   determining a second UL power limitation for a second TTI duration based at least in part on second power control parameter for the second TTI duration, wherein the second TTI duration is greater than the first TTI duration; and
   transmitting during a first TTI having the first TTI duration based at least in part on the first UL power limitation and the second UL power limitation, wherein transmitting during the first TTI comprises:
  transmitting a first message during the first TTI having the first TTI duration based at least in part on the first UL power limitation; and
  transmitting a second message during a second TTI having the second TTI duration based at least in part on the second UL power limitation, wherein the second TTI comprises the first TTI.

2. The method of claim 1, further comprising:
  adjusting a cell maximum transmit power parameter included in both the first UL power limitation and the second UL power limitation based at least in part on the second TTI comprising the first TTI.

3. The method of claim 1, further comprising:
  determining a first power headroom associated with the first TTI duration and a second power headroom associated with the second TTI duration; and
  transmitting a first power headroom report indicative of the first power headroom together with a second power headroom report indicative of the second power headroom.

4. The method of claim 1, further comprising:
  identifying a first set of subframes based at least in part on a first interference characteristic and a second set of subframes based at least in part on a second interference characteristic; and
  maintaining a first set of power control variables for the first set of subframes and a second set of power control variables for the second set of subframes, wherein the first UL power limitation or the second UL power limitation is based at least in part on the first set of power control variables or the second set of power control variables.

5. The method of claim 1, further comprising:
  determining whether the first message for the first TTI is scheduled to occur during the second message for the second TTI having the second TTI duration; and
  applying an adjustment factor to the second UL power limitation for the second message based at least in part on whether the first message is determined to occur during the second message.

6. The method of claim 5, wherein transmitting during the first TTI, comprises:
  transmitting the first message based at least in part on the first UL power limitation and transmitting the second message based at least in part on the second UL power limitation with the applied adjustment factor.

7. The method of claim 5, wherein the adjustment factor is based at least in part on a first power headroom associated with the first TTI duration and a second power headroom associated with the second TTI duration.

8. The method of claim 5, wherein the adjustment factor is calculated such that a sum of the first UL power limitation and the second UL power limitation with the adjustment factor is equal to a cell maximum transmit power parameter.

9. The method of claim 5, further comprising:
  selecting the adjustment factor from a set of power backoffs.

10. The method of claim 9, wherein the set of power backoffs comprises a power limited low latency backoff, a non-power limited low latency backoff, a low latency backoff, a non-low latency backoff, or any combination thereof.

11. An apparatus for wireless communication, comprising:
  a processor;
  memory in electronic communication with the processor; and
  instructions stored in the memory and operable, when executed by the processor, to cause the apparatus to:
    determine a first uplink (UL) power limitation for a first transmission time interval (TTI) duration based at least in part on a first power control parameter for the first TTI duration;
    determine a second UL power limitation for a second TTI duration based at least in part on second power control parameter for the second TTI duration, wherein the second TTI duration is greater than the first TTI duration; and
    transmit during a first TTI having the first TTI duration based at least in part on the first UL power limitation and the second UL power limitation, wherein the instructions executable to cause the apparatus to transmit during the first TTI are further executable by the processor to cause the apparatus to:
      transmit a first message during the first TTI having the first TTI duration based at least in part on the first UL power limitation; and
      transmit a second message during a second TTI having the second TTI duration based at least in part on the second UL power limitation, wherein the second TTI comprises the first TTI.

12. The apparatus of claim 11, wherein the instructions are further executable to cause the apparatus to:
  adjust a cell maximum transmit power parameter included in both the first UL power limitation and the second UL power limitation based at least in part on the second TTI comprising the first TTI.

13. The apparatus of claim 11, wherein the instructions are further executable to cause the apparatus to:
  determine a first power headroom associated with the first TTI duration and a second power headroom associated with the second TTI duration; and
  transmit a first power headroom report indicative of the first power headroom together with a second power headroom report indicative of the second power headroom.

14. The apparatus of claim 11, wherein the instructions are further executable to cause the apparatus to:
  identify a first set of subframes based at least in part on a first interference characteristic and a second set of subframes based at least in part on a second interference characteristic; and
  maintain a first set of power control variables for the first set of subframes and a second set of power control variables for the second set of subframes, wherein the first UL power limitation or the second UL power limitation is based at least in part on the first set of power control variables or the second set of power control variables.

15. The apparatus of claim 11, wherein the instructions are further executable to cause the apparatus to:
  determine whether the first message for the first TTI is scheduled to occur during the second message for the second TTI having the second TTI duration; and
  apply an adjustment factor to the second UL power limitation for the second message based at least in part on whether the first message is determined to occur during the second message.

16. The apparatus of claim 15, wherein the instructions executable to cause the apparatus to transmit during the first TTI are further executable by the processor to cause the apparatus to:

transmit the first message based at least in part on the first UL power limitation and transmitting the second message based at least in part on the second UL power limitation with the applied adjustment factor.

17. The apparatus of claim 15, wherein the adjustment factor is based at least in part on a first power headroom associated with the first TTI duration and a second power headroom associated with the second TTI duration.

18. The apparatus of claim 15, wherein the adjustment factor is calculated such that a sum of the first UL power limitation and the second UL power limitation with the adjustment factor is equal to a cell maximum transmit power parameter.

19. The apparatus of claim 15, wherein the instructions are further executable to cause the apparatus to:
select the adjustment factor from a set of power backoffs.

20. The apparatus of claim 19, wherein the set of power backoffs comprises a power limited low latency backoff, a non-power limited low latency backoff, a low latency backoff, a non-low latency backoff, or any combination thereof.

* * * * *